(12) United States Patent
Anabuki

(10) Patent No.: US 11,450,153 B2
(45) Date of Patent: *Sep. 20, 2022

(54) INFORMATION PROCESSING METHOD AND INFORMATION PROCESSING SYSTEM

(71) Applicant: Panasonic Intellectual Property Management Co., Ltd., Osaka (JP)

(72) Inventor: Motoshi Anabuki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,837

(22) Filed: Sep. 7, 2021

(65) Prior Publication Data

US 2021/0407223 A1    Dec. 30, 2021

Related U.S. Application Data

(63) Continuation of application No. 16/507,575, filed on Jul. 10, 2019, now Pat. No. 11,145,145.

(30) Foreign Application Priority Data

Jul. 19, 2018  (JP) .............................. JP2018-136099
Mar. 14, 2019  (JP) .............................. JP2019-047427

(51) Int. Cl.
*B60Q 1/00*    (2006.01)
*G07C 5/06*    (2006.01)
(Continued)

(52) U.S. Cl.
CPC .............. *G07C 5/06* (2013.01); *G08G 1/123* (2013.01); *G05D 1/0212* (2013.01); *G05D 2201/0213* (2013.01)

(58) Field of Classification Search
CPC ........ G07C 5/06; G08G 1/123; G05D 1/0212; G05D 2201/0213
See application file for complete search history.

(56) References Cited

U.S. PATENT DOCUMENTS 4,619,615 A * 10/1986 Kratzenberg ......... F41G 3/2655
                                                             348/121
5,176,082 A *  1/1993 Chun ....................... B61B 1/02
                                                             105/341.5
(Continued)

FOREIGN PATENT DOCUMENTS

EP        2 923 913       9/2015
JP        2015-182623     10/2015
(Continued)

OTHER PUBLICATIONS

Extended European Search Report dated Nov. 11, 2019 in corresponding European Patent Application No. 19184176.6.
(Continued)

*Primary Examiner* — Quang Pham
(74) *Attorney, Agent, or Firm* — Wenderoth, Lind & Ponack, L.L.P.

(57) ABSTRACT

An information processing method includes: obtaining, from vehicles, sensor data obtained from sensors of the vehicles; performing object detection processes each using a different one of the sensor data; determining a style of a presentation for monitoring or controlling the vehicles, using results of the object detection processes; and controlling the presentation made by a presentation device according to the style determined.

2 Claims, 19 Drawing Sheets

(51) Int. Cl.
 *G08G 1/123* (2006.01)
 *G05D 1/02* (2020.01)

(56) References Cited

U.S. PATENT DOCUMENTS

| | | | | |
|---|---|---|---|---|
| 6,065,570 | A * | 5/2000 | Friedli | B66B 3/00 |
| | | | | 187/387 |
| 6,919,804 | B1 * | 7/2005 | Cook | G07C 9/00 |
| | | | | 340/556 |
| 7,595,740 | B2 * | 9/2009 | Pechenick | G06Q 30/0249 |
| | | | | 235/383 |
| 9,294,878 | B2 * | 3/2016 | Tian | H04W 4/029 |
| 10,147,320 | B1 * | 12/2018 | Ellis | G01S 13/865 |
| 10,321,097 | B2 * | 6/2019 | Mitsuta | H04N 7/181 |
| 10,949,656 | B2 * | 3/2021 | Aoki | G06V 40/20 |
| 2004/0122884 | A1 * | 6/2004 | Lee | G08G 1/123 |
| | | | | 708/490 |
| 2004/0138809 | A1 * | 7/2004 | Mukaiyama | G08G 1/096716 |
| | | | | 701/2 |
| 2004/0194479 | A1 * | 10/2004 | Umebayashi | G08C 17/00 |
| | | | | 62/236 |
| 2005/0195092 | A1 * | 9/2005 | Takahashi | G08G 1/096811 |
| | | | | 340/384.5 |
| 2007/0197195 | A1 * | 8/2007 | Sugiyama | G06Q 30/02 |
| | | | | 455/412.2 |
| 2008/0129539 | A1 * | 6/2008 | Kumon | B60R 1/00 |
| | | | | 340/901 |
| 2008/0235138 | A1 * | 9/2008 | Yokota | G06Q 10/02 |
| | | | | 705/52 |
| 2009/0106036 | A1 * | 4/2009 | Tamura | G06Q 10/109 |
| | | | | 705/305 |
| 2009/0160678 | A1 * | 6/2009 | Turnbull | G08G 1/0955 |
| | | | | 340/944 |
| 2013/0268148 | A1 * | 10/2013 | Kondo | B61L 27/40 |
| | | | | 701/19 |
| 2014/0267282 | A1 * | 9/2014 | Ren | G09G 5/391 |
| | | | | 345/428 |
| 2014/0335823 | A1 * | 11/2014 | Heredia | H04W 48/18 |
| | | | | 455/411 |
| 2015/0070251 | A1 * | 3/2015 | Kim | G06F 3/165 |
| | | | | 345/8 |
| 2015/0237351 | A1 | 8/2015 | Lee | |
| 2015/0257713 | A1 * | 9/2015 | Tsukihara | G16Z 99/00 |
| | | | | 715/811 |
| 2016/0104328 | A1 * | 4/2016 | Chen | G07C 5/0858 |
| | | | | 701/414 |
| 2016/0150070 | A1 * | 5/2016 | Goren | G08G 1/0112 |
| | | | | 455/418 |
| 2016/0189345 | A1 * | 6/2016 | Fujita | B60K 37/02 |
| | | | | 345/660 |
| 2016/0239933 | A1 * | 8/2016 | Yang | G06Q 50/30 |
| 2016/0301698 | A1 * | 10/2016 | Katara | G07B 13/02 |
| 2017/0021764 | A1 * | 1/2017 | Adams | G06Q 40/08 |
| 2017/0102855 | A1 * | 4/2017 | Kwon | G06F 3/04847 |
| 2017/0169366 | A1 * | 6/2017 | Klein | G06Q 10/047 |
| 2017/0169373 | A1 * | 6/2017 | Roulland | G06Q 10/06313 |
| 2017/0277191 | A1 * | 9/2017 | Fairfield | H04W 4/029 |
| 2017/0297531 | A1 * | 10/2017 | Sakamoto | E05B 83/36 |
| 2017/0300020 | A1 * | 10/2017 | Kim | G06F 30/20 |
| 2017/0329438 | A1 * | 11/2017 | Kobel | B60J 5/0497 |
| 2017/0336629 | A1 * | 11/2017 | Suzuki | G05D 1/0253 |
| 2018/0032598 | A1 * | 2/2018 | Senger | B66B 25/006 |
| 2018/0047347 | A1 * | 2/2018 | Brush | G09G 5/377 |
| 2018/0086346 | A1 * | 3/2018 | Fujisawa | B60W 40/08 |
| 2018/0096599 | A1 * | 4/2018 | Nagao | B61L 15/0072 |
| 2018/0129981 | A1 * | 5/2018 | Fujimoto | G06V 40/10 |
| 2018/0137595 | A1 * | 5/2018 | Kim | G06Q 50/14 |
| 2018/0215312 | A1 * | 8/2018 | Salter | B60Q 1/50 |
| 2018/0261081 | A1 * | 9/2018 | Suzuki | B60Q 9/008 |
| 2018/0354535 | A1 * | 12/2018 | Cho | G06V 20/53 |
| 2019/0050758 | A1 * | 2/2019 | Kyllmann | G06Q 10/047 |
| 2019/0137290 | A1 * | 5/2019 | Levy | B60Q 1/50 |
| 2019/0139406 | A1 * | 5/2019 | Adachi | G08G 1/093 |
| 2019/0193728 | A1 * | 6/2019 | Tanaka | B60W 30/08 |
| 2019/0248383 | A1 * | 8/2019 | Maruta | B61B 1/02 |
| 2019/0251823 | A1 * | 8/2019 | Griffiths | B60N 2/002 |
| 2019/0319820 | A1 * | 10/2019 | Ogawa | H04L 12/46 |
| 2020/0070847 | A1 * | 3/2020 | Horiguchi | B60W 50/04 |
| 2020/0160631 | A1 * | 5/2020 | Ong | B61L 27/40 |
| 2020/0160708 | A1 * | 5/2020 | Kamiya | G08G 1/127 |

FOREIGN PATENT DOCUMENTS

| | | |
|---|---|---|
| JP | 2017-147626 | 8/2017 |
| KR | 20110089516 A | 8/2011 |
| WO | 2016/171370 | 10/2016 |
| WO | 2018/037900 | 3/2018 |

OTHER PUBLICATIONS

Office Action dated May 25, 2022 in counterpart Chinese Patent Application No. 201910638562.1 with English translation of Search Report, 16 pages.

* cited by examiner

FIG. 2A

| PRIORITY LEVEL INFORMATION ||
|---|---|
| VEHICLE ID | PRIORITY LEVEL |
| 11-11 | 1 |
| 22-22 | 2 |
| ... | ... |

FIG. 2B

| BOARDING AND ALIGHTING DATA (DATABASE) ||||
|---|---|---|---|
| TIME | LOCATION | BOARDING AND ALIGHTING PASSENGER ATTRIBUTE AND COUNT | REQUIRED TIME |
| 7:00 | POINT A | ADULT: 3, ELDERLY: 5, ... | 3 MINUTES |
| 8:00 | POINT B | ADULT: 10, CHILD: 3, ... | 2 MINUTES |
| ... | ... | ... | ... |

FIG. 2C

| BOARDING AND ALIGHTING DATA (DATABASE) ||
|---|---|
| BOARDING AND ALIGHTING PASSENGER ATTRIBUTE | BOARDING AND ALIGHTING TIME |
| ADULT | 3 SECONDS/PERSON |
| ELDERLY | 5 SECONDS/PERSON |
| ... | ... |

FIG. 4D

| PRIORITY LEVEL | | | |
|---|---|---|---|
| 1 UNTIL COMPLETION OF BOARDING AND ALIGHTING 1 MINUTE 00 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 2<br>BUS STOP: CITY HALL | 2 UNTIL COMPLETION OF BOARDING AND ALIGHTING 1 MINUTE 08 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 1<br>BUS STOP: HOSPITAL | 3 UNTIL COMPLETION OF BOARDING AND ALIGHTING 1 MINUTE 30 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 3<br>BUS STOP: CITY HALL | 4 UNTIL COMPLETION OF BOARDING AND ALIGHTING 1 MINUTE 48 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 6<br>BUS STOP: STATION |
| 5 UNTIL COMPLETION OF BOARDING AND ALIGHTING 2 MINUTES 00 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 4<br>BUS STOP: PARK | 6 UNTIL COMPLETION OF BOARDING AND ALIGHTING 2 MINUTES 30 SECONDS<br>[VEHICLE INSIDE IMAGE] [ENTRANCE AND EXIT IMAGE]<br>[VEHICLE OUTSIDE IMAGE 1] [VEHICLE OUTSIDE IMAGE 2]<br>VEHICLE ID: 5<br>BUS STOP: BUS DEPOT | | |

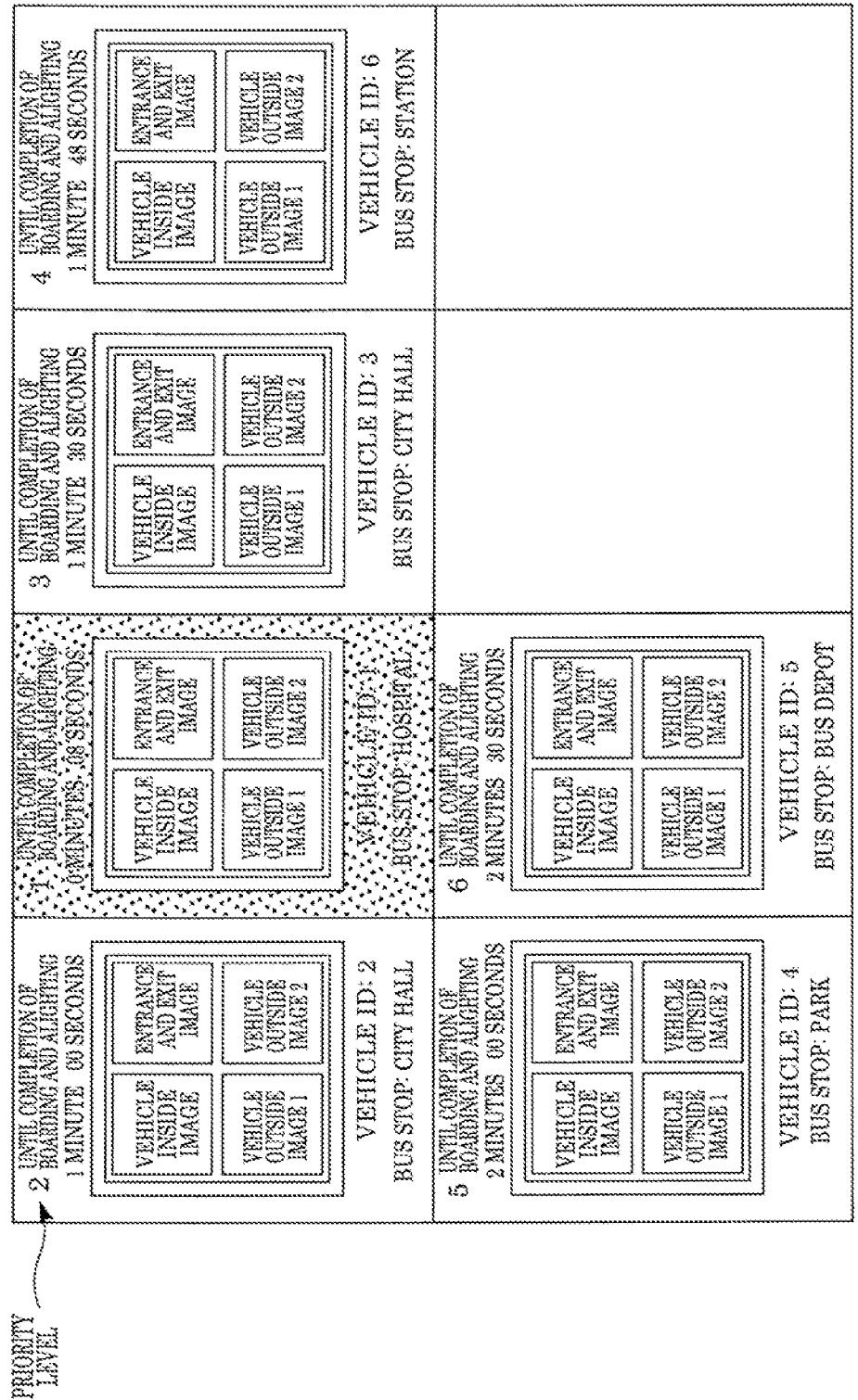

FIG. 8A

| VEHICLE DATA (DATABASE) | | | |
|---|---|---|---|
| LOCATION | LABEL | RECOMMENDED OPERATION | DANGER LEVEL |
| POINT A | DANGER OF RUSHING OUT | SLOW DOWN | HIGH |
| POINT B | UNDER CONSTRUCTION | REMOTE DRIVING | MEDIUM |
| ... | ... | | |

FIG. 8B

| VEHICLE DATA (DATABASE) | | | |
|---|---|---|---|
| STATE | LABEL | RECOMMENDED OPERATION | DANGER LEVEL |
| AEB ACTIVATION | EMERGENCY STOP | STOP | HIGH |
| TEMPORARY STOP | TEMPORARY STOP | CHECK | MEDIUM |
| ... | ... | | |

FIG. 8C

| VEHICLE DATA (DATABASE) | | | |
|---|---|---|---|
| SITUATION | LABEL | RECOMMENDED OPERATION | DANGER LEVEL |
| PEDESTRIAN ON ROAD | DANGER OF ACCIDENT | SLOW DOWN | HIGH |
| BICYCLE BEHIND | DANGER OF RIGHT- OR LEFT-TURN COLLISION | CHECK NEEDED | MEDIUM |
| ... | ... | | |

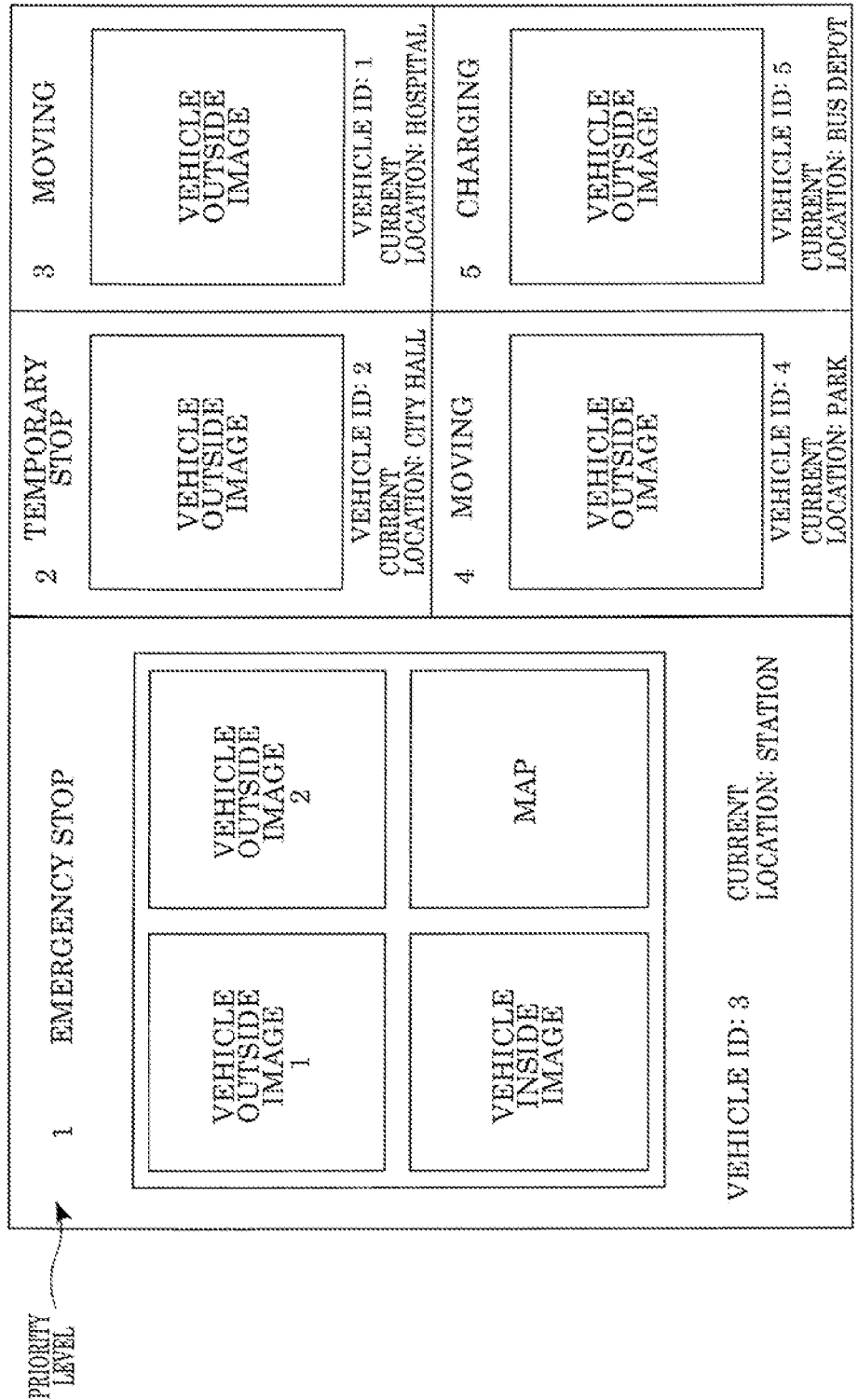

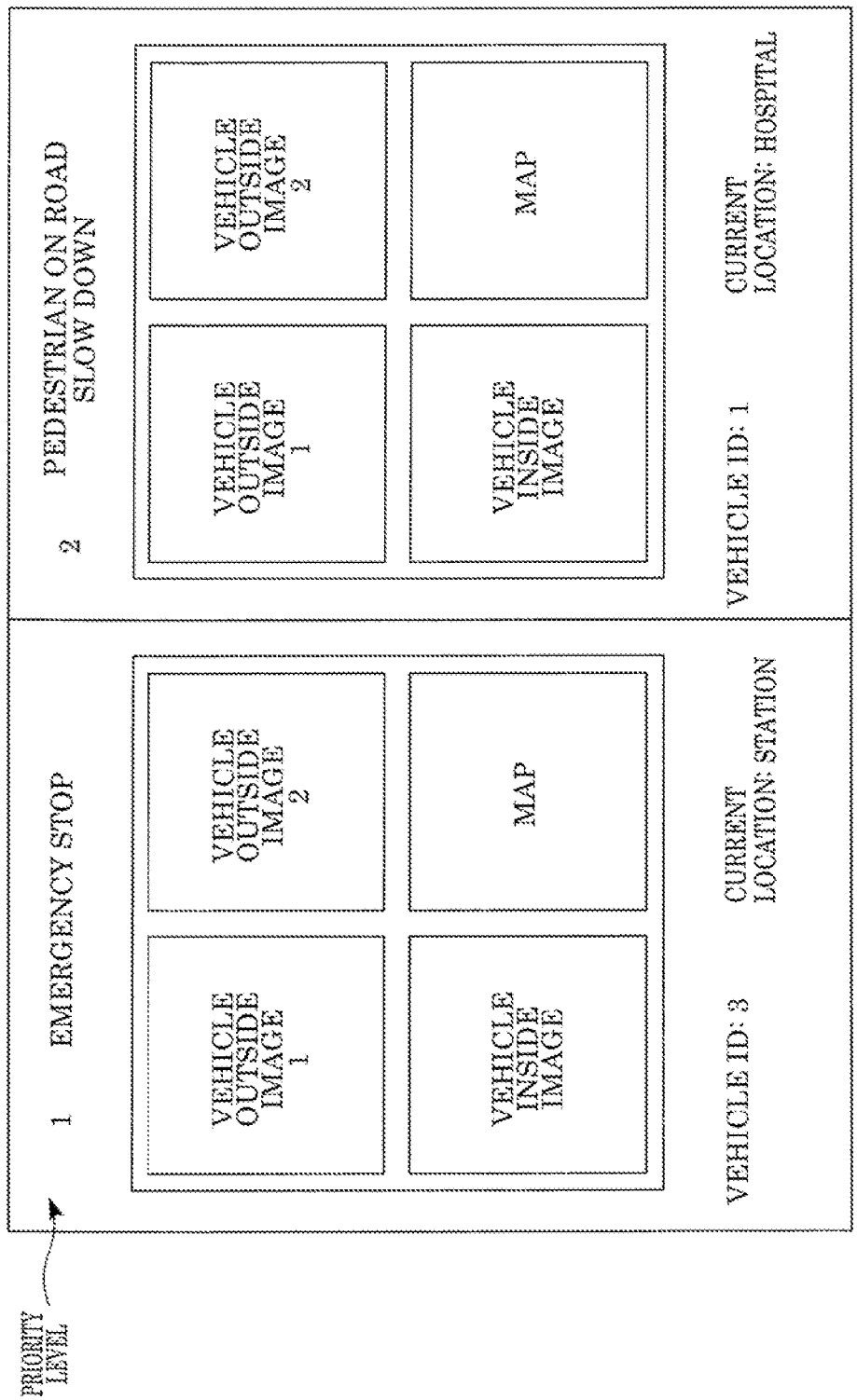

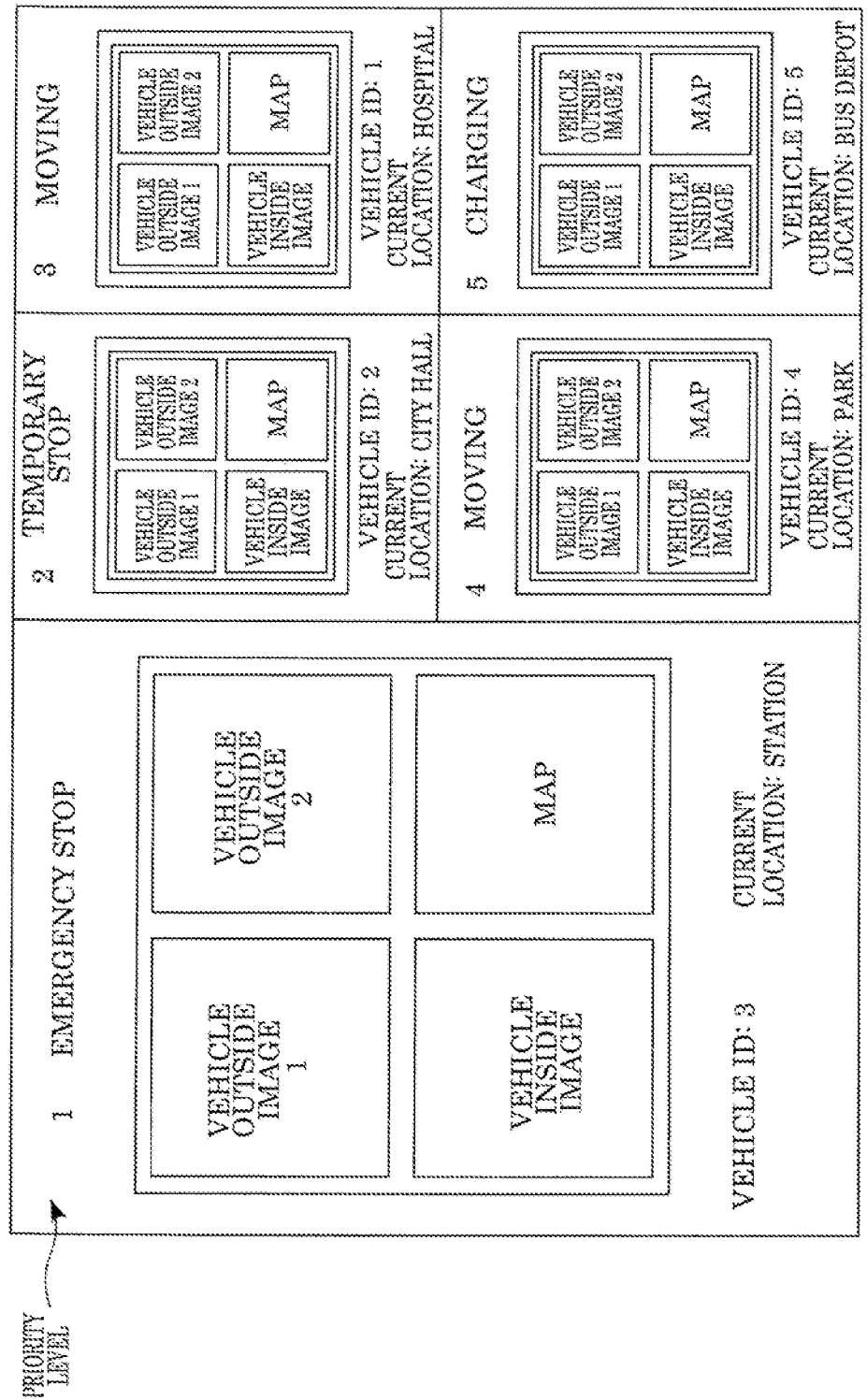

FIG. 10D

| Priority | | | |
|---|---|---|---|
| 1 EMERGENCY STOP<br>VEHICLE ID: 2<br>CURRENT LOCATION: CITY HALL | 2 BICYCLE BEHIND SLOW DOWN<br>VEHICLE ID: 1<br>CURRENT LOCATION: HOSPITAL | 3 TEMPORARY STOP<br>VEHICLE ID: 3<br>CURRENT LOCATION: CITY HALL | 3 MOVING<br>VEHICLE ID: 6<br>CURRENT LOCATION: STATION |
| 5 MOVING<br>VEHICLE ID: 4<br>CURRENT LOCATION: PARK | 6 CHARGING<br>VEHICLE ID: 5<br>CURRENT LOCATION: BUS DEPOT | | |

Each cell contains: VEHICLE OUTSIDE IMAGE 1, VEHICLE OUTSIDE IMAGE 2, VEHICLE INSIDE IMAGE, MAP

FIG. 10E

| PRIORITY LEVEL | | | |
|---|---|---|---|
| 2 TEMPORARY STOP<br>VEHICLE ID: 2<br>CURRENT LOCATION: CITY HALL | 1 PEDESTRIAN ON ROAD<br>VEHICLE ID: 1<br>CURRENT LOCATION: HOSPITAL | 3 TEMPORARY STOP<br>VEHICLE ID: 3<br>CURRENT LOCATION: CITY HALL | 3 MOVING<br>VEHICLE ID: 6<br>CURRENT LOCATION: STATION |
| 5 MOVING<br>VEHICLE ID: 4<br>CURRENT LOCATION: PARK | 6 CHARGING<br>VEHICLE ID: 5<br>CURRENT LOCATION: BUS DEPOT | | |

INFORMATION PROCESSING METHOD AND INFORMATION PROCESSING SYSTEM

CROSS REFERENCE TO RELATED APPLICATIONS

This application is a continuation of U.S. application Ser. No. 16/507,575 filed Jul. 10, 2019, which claims the benefit of priority of Japanese Patent Application Number 2018-136099 filed on Jul. 19, 2018, and the benefit of priority of Japanese Patent Application Number 2019-047427 filed on Mar. 14, 2019, the entire contents of which are hereby incorporated by reference.

BACKGROUND

1. Technical Field

The present disclosure relates to an information processing method and an information processing system.

2. Description of the Related Art

In recent years, self-driving techniques have been introduced and increasingly researched and developed. It is expected that, along with the advancement of the self-driving techniques, unmanned self-driving vehicles will become widely used in the future. From a standpoint of safety, the operation of unmanned self-driving vehicles requires monitoring of the vehicles by operators in remote places. Some techniques for monitoring vehicles have been proposed.

For example, Patent Literature (PTL) 1 (Japanese Unexamined Patent Application Publication No. 2017-147626) discloses a technique for determining a remote control device that sends a remote control request to a control center when a vehicle enters a remote control target area, and allows the control center to remotely control the vehicle for which the remote control request has been sent.

Moreover, PTL 2 (Japanese Unexamined Patent Application Publication No. 2015-182623) discloses a technique for changing the departure times of trains according to the number of passengers entering a station.

SUMMARY

In the conventional technique disclosed in PTL 1, when vehicles enter a remote control target area, an operator simultaneously considers the vehicles as remote control targets. As a result, a single operator finds it difficult to remotely control the vehicles at the same time.

Moreover, the conventional technique disclosed in PTL 2 is intended for an operator in a single vehicle, and does not assume that a single operator manages vehicles at the same time.

In view of the above, the present disclosure provides an information processing method, an information processing apparatus, and an information processing system that make it possible to reduce the burden of an operator who monitors or controls vehicles while assuring safety for the vehicles by the monitoring or controlling.

In order to achieve the above object, an information processing method according to one aspect of the present disclosure includes: obtaining, from vehicles, sensor data obtained from sensors of the vehicles; performing object detection processes each using a different one of the sensor data; determining a style of a presentation for monitoring or controlling the vehicles, using results of the object detection processes; and controlling the presentation made by a presentation device according to the style determined.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

The information processing method etc. of the present disclosure make it possible to reduce the burden of an operator who monitors or controls vehicles while assuring safety for the vehicles by the monitoring or controlling.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2A is a table illustrating priority level information according to Embodiment 1.

FIG. 2B is a table illustrating a database according to Embodiment 1.

FIG. 2C is a table illustrating a database according to Embodiment 1.

FIG. 4D is a diagram illustrating a presentation made by the terminal according to Embodiment 1.

FIG. 4E is a diagram illustrating a presentation made by the terminal according to Embodiment 1.

FIG. 8A is a table illustrating a database according to Embodiment 2.

FIG. 8B is a table illustrating a database according to Embodiment 2.

FIG. 8C is a table illustrating a database according to Embodiment 2.

FIG. 10A is a diagram illustrating a presentation made by a terminal according to Embodiment 2.

FIG. 10B is a diagram illustrating a presentation made by the terminal according to Embodiment 2.

FIG. 10C is a diagram illustrating a presentation made by the terminal according to Embodiment 2.

FIG. 10D is a diagram illustrating a presentation made by the terminal according to Embodiment 2.

FIG. 10E is a diagram illustrating a presentation made by the terminal according to Embodiment 2.

DETAILED DESCRIPTION OF THE EMBODIMENTS

Figure 1:
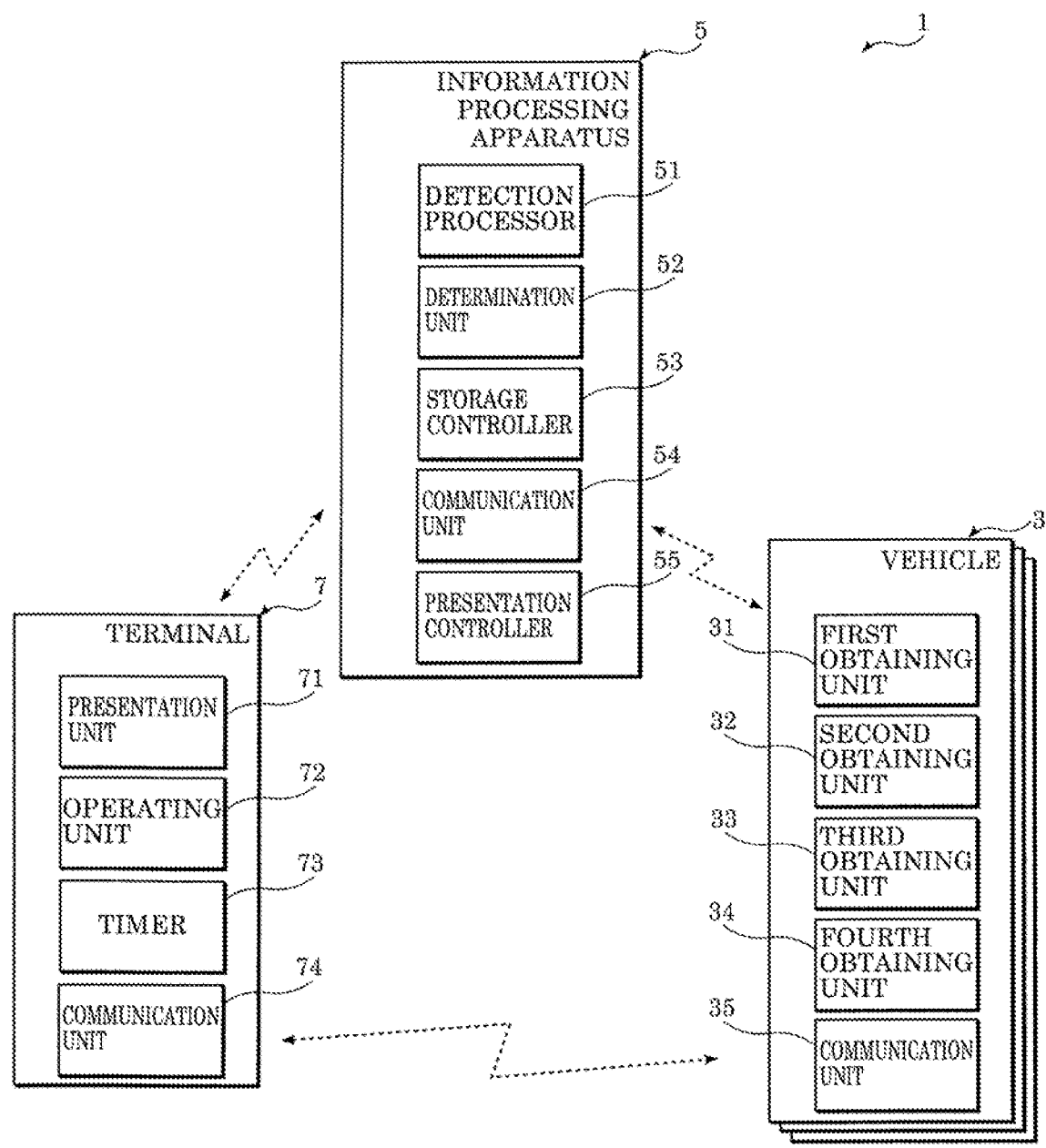
FIG. 1 is a block diagram of an information processing system according to Embodiment 1.

An information processing method according to one aspect of the present disclosure includes: obtaining, from vehicles, sensor data obtained from sensors of the vehicles; performing object detection processes each using a different one of the sensor data; determining a style of a presentation for monitoring or controlling the vehicles, using results of the object detection processes; and controlling the presentation made by a presentation device according to the style determined.

Since a presentation for monitoring or controlling (hereinafter collectively and simply also referred to as monitoring) vehicles is made in a style determined using the results of objection detection processes, an operator who monitors vehicles can easily find out vehicles to be monitored. In other words, it is possible to reduce the number of vehicles to be simultaneously monitored by the operator while diminishing the operator's risk for overlooking vehicles to be monitored. Accordingly, it is possible to reduce the burden of the operator who monitors vehicles while assuring safety for vehicles by the monitoring.

An information processing apparatus according to one aspect of the present disclosure includes: an obtaining unit that obtains, from vehicles, sensor data obtained from sensors of the vehicles; a detection processor that performs object detection processes each using a different one of the sensor data; a determination unit that determines a style of a presentation for monitoring or controlling the vehicles, using results of the object detection processes; and a presentation controller that controls the presentation made by a presentation device according to the style determined.

An information processing system according to one aspect of the present disclosure includes the information processing apparatus and the presentation device.

The information processing apparatus and the information processing system produce the same advantageous effects as above.

The information processing method according to one aspect of the present disclosure further includes: determining priority levels of the vehicles based on the results of the object detection processes; and determining the style of the presentation according to the priority levels.

Since a presentation device makes a presentation for monitoring or controlling vehicles according to priority levels of the vehicles, an operator who monitors the vehicles can find out vehicles to be preferentially monitored among the vehicles. For this reason, the operator can monitor any vehicle having a higher priority level than those of other vehicles, and thus it is possible to reduce the burden of the operator while assuring safety for vehicles.

Moreover, the information processing method according to one aspect of the present disclosure further includes: obtaining states of the vehicles from the vehicles; and determining the priority levels based on the results of the object detection processes and the states of the vehicles.

It is possible to determine priority levels of vehicles more appropriately using not only the results of object detection processes but also the states of the vehicles. This allows an operator who monitors vehicles to further easily find out vehicles to be preferentially monitored among the vehicles. For this reason, the operator can further easily monitor any vehicle having a higher priority level than those of other vehicles, and thus it is possible to further reduce the burden of the operator while assuring safety for vehicles.

Moreover, in the information processing method according to one aspect of the present disclosure, in each of the object detection processes, at least one of a boarding passenger and an alighting passenger is detected for a stopped vehicle, and the style of the presentation is determined according to the at least one of the boarding passenger and the alighting passenger detected.

It is conventionally difficult to control timing for departure by determining completion of boarding a vehicle or alighting from a vehicle. For example, it is difficult to determine whether a person close to a vehicle is a person planning to board, based on sensor data. When an erroneous determination is made, a boarding and alighting passenger may be put in danger. On the other hand, although it is conceivable that a monitoring operator controls timing for departure, constant monitoring of boarding and alighting states of vehicles increases the burden of the operator. In view of the above, with the present configuration, since a style of a presentation for monitoring is controlled according to boarding and alighting passengers, an operator can easily find out vehicles to be monitored. Accordingly, it is possible to reduce the burden of the operator while assuring safety for vehicles at the time of boarding and alighting. It should be noted that the present configuration is effective even when a departure is automatically controlled. This is because the departure may cause danger as described above, and the operator is required to preferentially perform monitoring.

Moreover, in the information processing method according to one aspect of the present disclosure, in each of the object detection processes, an attribute or a count of at least one of the boarding passenger and the alighting passenger is detected, and the style of the presentation is determined according to the attribute or the count detected.

Since a presentation is made in a style according to elements regarding priority levels for monitoring at the time of boarding and alighting, an operator can more accurately find out vehicles to be monitored.

Moreover, the information processing method according to one aspect of the present disclosure further includes: calculating a time for completion of at least one of the boarding passenger boarding the stopped vehicle and the alighting passenger alighting from the stopped vehicle, using the attribute or the count; and determining the style of the presentation according to the time calculated.

Since a presentation is made in a style according to boarding and alighting time, it is possible to present vehicles to an operator according to timing for monitoring. Accordingly, it is possible to present vehicles to be monitored in a more timely manner. For example, it is possible to present, as a vehicle to be preferentially monitored, a vehicle having a calculated time shorter than that of another vehicle.

Moreover, in the information processing method according to one aspect of the present disclosure, in each of the object detection processes, an object outside a moving vehicle and a position of the object are detected, and the style of the presentation is determined according to the object and the position of the object detected.

Conventionally, there is a technique for controlling the operation of a vehicle according to a state of an object outside the vehicle. However, the state of the object varies, and it is difficult to perform control assuming everything. On the other hand, it is conceivable that a monitoring operator checks the outside of a vehicle, constant monitoring of the outsides of vehicles increases the burden of the operator. In view of the above, with the present configuration, since a style of a presentation for monitoring is controlled according to objects outside vehicles, an operator can easily find out vehicles to be monitored. Accordingly, it is possible to reduce the burden of the operator while assuring safety for vehicles when objects are located outside vehicles.

Moreover, the information processing method according to one aspect of the present disclosure further includes: calculating, for each of the vehicles, at least one of a difficulty level of self-driving by the vehicle and a danger level outside the vehicle, using the object and the position of the object; and determining the style of the presentation according to the at least one of the difficulty level and the danger level calculated.

Since a presentation is made in a style according to at least one of difficulty levels of self-driving and danger levels outside vehicles, an operator can more accurately find out vehicles to be monitored. For example, it is possible to present, as a vehicle to be preferentially monitored, a vehicle having at least one of a relatively high difficulty level of self-driving and a relatively high danger level outside the vehicle.

Moreover, in the information processing method according to one aspect of the present disclosure, the presentation includes displaying an image showing at least one of an entrance and an exit of each of the vehicles.

For this reason, an operator can easily check safety at the time of boarding and alighting.

Moreover, in the information processing method according to one aspect of the present disclosure, the presentation includes displaying an image showing an outside of each of the vehicles.

For this reason, an operator can easily check safety outside a vehicle.

Moreover, in the information processing method according to one aspect of the present disclosure, the determining of the style of the presentation includes providing a higher visibility of the presentation for a higher priority level that is a priority level included in the priority levels.

Since a higher visibility is provided for a vehicle having a higher priority level, an operator can quickly check information regarding vehicles to be monitored.

Moreover, in the information processing method according to one aspect of the present disclosure, the determining of the style of the presentation includes providing a greater amount of information in the presentation for a higher priority level that is a priority level included in the priority levels.

Since a greater amount of information is provided for a vehicle having a higher priority level in a presentation, an operator can understand the details of information regarding vehicles to be monitored.

Further, since a less amount of information is provided for a vehicle having a lower priority level, it is possible to reduce frame rates of vehicles to be presented to the operator, and degrade image quality. For this reason, it is possible to reduce network load among devices, vehicles, and presentation devices that execute this information processing method.

Moreover, in the information processing method according to one aspect of the present disclosure, the determining of the style of the presentation includes emphasizing the presentation further for a higher priority level that is a priority level included in the priority levels.

Since a presentation is emphasized further for a vehicle having a higher priority level, an operator can quickly identify vehicles to be monitored.

Moreover, in the information processing method according to one aspect of the present disclosure, the determining of the style of the presentation includes starting the presentation when a priority level included in the priority levels exceeds a threshold value.

Since only a vehicle having a priority level higher than or equal to a threshold value is presented, an operator can focus on vehicles to be monitored.

Moreover, in the information processing method according to one aspect of the present disclosure, the determining of the style of the presentation includes arranging the presentation in order of the priority levels.

Since vehicles are presented in order of priority levels, an operator can quickly identify vehicles to be monitored. In addition, the operator can check a vehicle to be monitored next in advance, which can make monitoring more efficient.

Moreover, in the information processing method according to one aspect of the present disclosure, the priority levels are further determined based on at least one of positions of the vehicles, times corresponding to the positions of the vehicles, histories of required times for a boarding passenger to complete boarding and required times for an alighting passenger to complete alighting, and weather information corresponding to the positions of the vehicles.

With this, it is possible to set priority levels to vehicles more appropriately. For this reason, it is possible to cause a presentation device to present vehicles to be monitored more appropriately.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Hereinafter, embodiments will be described in detail with reference to the drawings. It should be noted that each of the embodiments described hereinafter shows a specific example of the present disclosure. The numerical values, shapes, materials, structural components, the arrangement and connection of the structural components, steps, the processing order of the steps, etc., shown in the following embodiments are mere examples, and are therefore not intended to limit the present disclosure. Furthermore, among the structural components in the following embodiments, structural components not recited in any one of the independent claims defining the most generic concept of the present disclosure are described as optional structural components.

It should be noted that the figures are schematic diagrams and are not necessarily precise illustrations. Furthermore, in the figures, substantially identical components are assigned the same reference signs, and overlapping description thereof may be omitted or simplified.

In what follows, an information processing method, an information processing apparatus, and an information processing system according to each of the embodiments of the present disclosure will be described.

EMBODIMENT 1

(Configuration)

FIG. 1 is a block diagram of information processing system 1 according to Embodiment 1.

Information processing system 1 includes vehicle 3, information processing apparatus 5, and terminal 7.

Vehicle 3 is a self-driving vehicle that can be driven by remote control by a remote control operator thereof, and can self-drive when not remotely controlled. Examples of vehicle 3 include a bus, a tax, and a train. The present embodiment assumes that vehicle 3 is a bus and has stopped at a stop (bus stop). Hereinafter, a person who gets on or plans to get on vehicle 3 is referred to as a boarding passenger, and a person who gets off or plans to get off vehicle 3 is referred to as an alighting passenger. A term indicating both boarding passengers and alighting passengers is referred to as boarding and alighting passengers.

Vehicle 3 includes first obtaining unit (first obtainer) 31, second obtaining unit (second obtainer) 32, third obtaining unit (third obtainer) 33, fourth obtaining unit (fourth obtainer) 34, and communication unit (communicator) 35.

First obtaining unit 31 is a device that obtains information indicating boarding and alighting start times, and is, for example, a clock. Specifically, a boarding and alighting start time indicates a time at which a boarding and alighting passenger starts boarding or alighting from vehicle 3 when vehicle 3 has stopped at a stop. First obtaining unit 31 transmits the information indicating the boarding and alighting start times to information processing apparatus 5. It should be noted that a boarding and alighting start time may be a time at which vehicle 3 is stopped at a stop by automated driving.

Second obtaining unit 32 obtains vehicle position information (e.g. global positioning system (GPS) information) indicating the current position of vehicle 3. Second obtaining unit 32 transmits the obtained vehicle position information to information processing apparatus 5 and terminal 7. The current position of vehicle 3 is an example of the position of vehicle 3.

Third obtaining unit 33 is a device that obtains boarding and alighting passenger images that are captured images of boarding and alighting passengers boarding and alighting from vehicle 3, and is, for example, a camera. Specifically, third obtaining unit 33 generates boarding and alighting passenger images by capturing people. (e.g. boarding passengers) waiting at a stop of vehicle 3 and people (e.g. alighting passengers) standing up in vehicle 3. Third obtaining unit 33 transmits the boarding and alighting passenger images to information processing apparatus 5. Third obtaining unit 33 is an example of a sensor. Moreover, a boarding and alighting passenger image is an example of sensor data.

Fourth obtaining unit 34 is a device that obtains vehicle inside and outside images each showing the inside and outside of vehicle 3, and is, for example, a camera. A vehicle inside and outside image includes vehicle's surroundings, that is, information about pedestrians, vehicles, bicycles, etc. outside vehicle 3, information shout passengers inside vehicle 3, and information about boarding and alighting passengers close to the entrance and exit of vehicle 3. Fourth obtaining unit 34 transmits the vehicle inside and outside images to terminal 7. It should be noted that fourth obtaining unit 34 may be used for third obtaining unit 33, and boarding and alighting passenger images may be vehicle inside and outside images.

Communication unit 35 is a communication interface that transmits information indicating boarding and alighting start times, vehicle position information, and boarding and alighting passenger images to information processing apparatus 5, and transmits the vehicle position information and vehicle inside and outside images to terminal 7. In addition, communication unit 35 receives control commands for remote control when vehicle 3 is remotely controlled by a remote control operator. Communication unit 35 outputs control commands to an actuator, an indicator, etc. (not shown) that control vehicle 3.

Here, there are vehicles 3, and each of vehicles 3 has a vehicle ID for identifying itself. Communication unit 35 transmits information indicating boarding and alighting start times, vehicle position information, and boarding and alighting passenger images associated with the respective vehicle IDs to information processing apparatus 5, and transmits vehicle inside and outside images associated with the respective vehicle IDs to terminal 7.

Information processing apparatus 5 is a device capable of remotely controlling vehicles 3 that are self-driving, according to an instruction from an operator in a remote place. Information processing apparatus 5 includes detection processor 51, determination unit (determiner) 52, storage controller 53, communication unit 54, and presentation controller 55.

Detection processor 51 performs object detection processes. Examples of an object detection process include detecting at least one of boarding passengers and alighting passengers for vehicle 3 that has stopped, and detecting at least one of boarding passenger attributes or count and alighting passenger attributes or count. Specifically, detection processor 51 obtains boarding and alighting passenger images from third obtaining unit 33 of each vehicle 3, detects a boarding and alighting passenger count, boarding and alighting passenger attributes, etc., based on the boarding and alighting passenger images, and generates boarding and alighting passenger information for each vehicle 3. A boarding and alighting passenger attribute indicates information such as adult, child, and elderly. Detection processor 51 outputs boarding and alighting passenger information to determination unit 52.

Determination unit 52 determines a style of a presentation for monitoring or controlling vehicles 3, using the results of the object detection processes. Styles of presentation will be described in detail later.

Moreover, determination unit 52 obtains boarding and alighting passenger information from detection processor 51, and obtains previous boarding and alighting data from a database stored in storage controller 53 when determination unit 52 obtains a boarding and alighting start time and vehicle position information from first obtaining unit 31 and second obtaining unit 32 of each vehicle 3. Specifically, determination unit 52 requests, from storage controller 53, previous boarding and alighting data similar to the boarding and alighting passenger information, the boarding and alighting start time, and the vehicle position information, and obtains the similar previous boarding and alighting data from storage controller 53.

Determination unit 52 obtains previous boarding and alighting data from storage controller 53, and determines, for respective vehicles 3, priority levels that are indicators for monitoring vehicles 3 on a priority basis. As shown in FIG. 2A, determination unit 52 transmits priority level information in which the determined priority levels are associated with the vehicle IDs of vehicles 3 to terminal 7. FIG. 2A is a table illustrating priority level information according to Embodiment 1.

Storage controller 53 stores previous boarding and alighting data of which a database is made. Boarding and alighting data is information such as boarding and alighting start times, stops, boarding and alighting passenger attributes, boarding and alighting passenger counts each for a different one of boarding and alighting passenger attributes, required times for all boarding and alighting passengers to complete boarding and alighting, and boarding and alighting times each corresponding to a different one of the boarding and alighting passenger attributes. In response to a request from determination unit 52, storage controller 53 searches for previous boarding and alighting data similar to boarding and alighting passenger information, and transmits the similar previous boarding and alighting data to determination unit 52. It should be noted that storage controller 53 may store a trained model trained using previous boarding and alighting data, instead of the previous boarding and alighting data of which the database is made. In this case, storage controller 53 transmits the trained model to determination unit 52 in response to a request from determination unit 52.

FIG. 2B and FIG. 2C show boarding and alighting data. FIG. 2B and FIG. 2C each are a table illustrating boarding and alighting data according to Embodiment 1. As shown in FIG. 2B, the boarding and alighting data include "TIME" when vehicle 3 stopped at a stop, "LOCATION" at which vehicle 3 stopped, "BOARDING AND ALIGHTING PASSENGER ATTRIBUTE AND COUNT," and "REQUIRED TIME" for all boarding and alighting passengers to complete boarding and alighting. As shown in FIG. 2C, the boarding and alighting data further includes "BOARDING AND ALIGHTING TIME" per person in connection with each boarding and alighting passenger attribute.

As shown in FIG. 1, communication unit 54 is a communication interface that receives information indicating boarding and alighting start times, vehicle position information, and boarding and alighting passenger images, and transmits priority level information to terminal 7. Communication unit 54 is an example of an obtaining unit.

Presentation controller 55 controls a style of a presentation made by terminal 7 according to the style of the presentation determined by determination unit 52. In other words, presentation controller 55 outputs a command for controlling a presentation made by terminal 7 so that terminal 7 makes the presentation in the style according to priority levels determined.

Terminal 7 is an operating terminal used by an operator to monitor the moving state of vehicle 3 and remotely operate vehicle 3, and is, for example, a personal computer and a tablet terminal. Terminal 7 includes presentation unit (presenter) 71, operating unit (operator) 72, timer 73, and communication unit 74.

Presentation unit 71 is a monitor that presents vehicle inside and outside images, vehicle position information, etc. for each vehicle 3. Specifically, presentation unit 71 presents, for each vehicle 3, information regarding vehicle 3 such as a vehicle inside image, an entrance and exit image, an image of the outside of vehicle 3 (the surroundings of vehicle 3), a priority level, a boarding and alighting completion time, a vehicle ID and a stop.

Presentation unit 71 presents information regarding vehicles 3 in various styles. Presentation unit 71 presents, for example, the information regarding vehicle 3 having the highest priority level with a large-area image, only the information regarding vehicle 3 having a priority level higher than or equal to a threshold value among vehicles 3, the information regarding vehicle 3 having a high priority level in detail, information regarding vehicles 3 arranged in the order according to their priority levels with same-size images, and vehicle 3 having the highest priority level whose image is emphasized by being colored.

Operating unit 72 is an input unit that receives remote control of vehicle 3 by an operator. The operator checks whether all boarding and alighting passengers have boarded and alighted (check on completion of boarding and alighting), and operates operating unit 72 when vehicle 3 is caused to depart. Operating unit 72 is, for example, a touch panel and a keyboard. Operating unit 72 transmits control commands for remote control to vehicle 3 via communication unit 74.

Timer 73 is, for example, a clock that measures the time when the operator operates operating unit 72 to transmit a control command for causing vehicle 3 to depart.

Communication unit 74 is a communication interface that transmits control commands to vehicle 3.

It should be noted that, in the present embodiment, timer 73 is not an essential component in terminal 7, and second obtaining unit 32 is not an essential component in vehicle 3. For this reason, timer 73 and second obtaining unit 32 need not be included, and any one of timer 73 and second obtaining unit 32 may be provided.

(Operation)

Next, the following describes the operation of the information processing method, information processing apparatus 5, and information processing system 1 according to the present embodiment. Specifically, the following describes the operation of information processing system 1 performed from when vehicle 3 stops at a bus stop to when vehicle 3 departs after a certain period of time.

Figure 3:
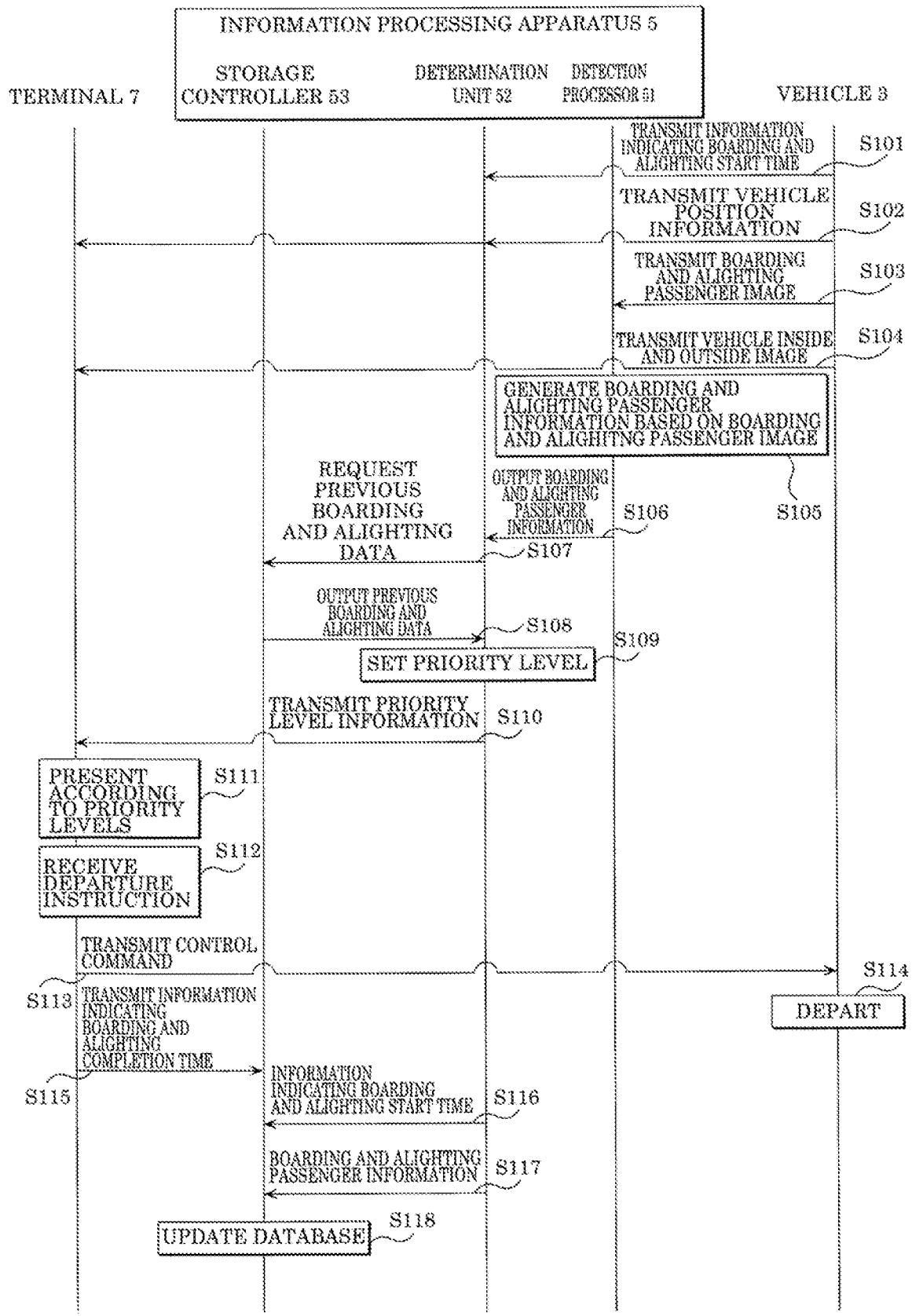
FIG. 3 is a sequence diagram illustrating the operation of the information processing system according to Embodiment 1.

FIG. 3 is a sequence diagram illustrating the operation of information processing system 1 according to Embodiment 1.

As shown in FIG. 3, vehicle 3 obtains information indicating a boarding and alighting start time, and transmits the obtained information to information processing apparatus 5 (step S101). In addition, vehicle 3 obtains vehicle position information indicating the current position of vehicle 3, and transmits the obtained vehicle position information to information processing apparatus 5 and terminal 7 (step S102). Determination unit 52 of information processing apparatus 5 receives the information indicating the boarding and alighting start time and the vehicle position information via communication unit 54.

Moreover, vehicle 3 obtains boarding and alighting passenger images that are captured images of boarding and alighting passengers boarding and alighting from vehicle 3, and transmits the obtained boarding and alighting passenger images to information processing apparatus 5 (step S103). Detection processor 51 of information processing apparatus 5 receives the boarding and alighting passenger images via communication unit 54.

In the mean time, vehicle 3 obtains vehicle inside and outside images, and transmits the obtained vehicle inside and outside images to terminal 7 (step S104).

Detection processor 51 generates boarding and alighting passenger information by detecting a boarding and alighting passenger count, boarding and alighting passenger attributes, etc., based on the boarding and alighting passenger images received in step S103 (step S105). Detection processor 51 outputs the boarding and alighting passenger information to determination unit 52 (step S106).

Determination unit 52 requests, from storage controller 53, previous boarding and alighting data similar to the obtained hoarding and alighting passenger information, boarding and alighting start time, and vehicle position information (step S107).

In response to the request from determination unit 52, storage controller 53 searches for the previous boarding and alighting data similar to the boarding and alighting passenger information, the boarding and alighting start time, and the vehicle position information, and outputs the similar previous boarding and alighting data to determination unit 52 (step S108). Boarding and alighting data includes information such as times at which vehicle 3 stops at stops, stops, boarding and alighting passenger attributes, counts each for a different one of boarding and alighting passenger attributes, required times from when all boarding and alighting passengers start boarding and alighting to when the all boarding and alighting passengers finish boarding and alighting, boarding and alighting times each for a different one of the boarding and alighting passenger attributes, as shown in FIG. 2B and FIG. 2C. It should be noted that storage controller 53 may transmit a trained model to determination unit 52 in response to a request from determination unit 52, instead of outputting similar previous boarding and alighting data in response to a request from determination unit 52.

Determination unit 52 obtains the previous boarding and alighting data from storage controller 53, and sets a priory level for monitoring for each vehicle 3 (step S109). Determination unit 52 determines a priority level for each vehicle 3 according to the boarding and alighting passenger information, the boarding and alighting start time, and the vehicle position information. The priority levels will be described later. Determination unit 52 transmits, to terminal 7, priority level information in which the set priory levels are associated with the vehicle IDs (step S110). It should be noted that determination unit 52 may obtain a trained model from storage controller 53 instead of obtaining previous boarding and alighting data from storage controller 53, and set a priority level for monitoring for each vehicle 3. In this case, determination unit 52 determines the priority level for each vehicle 3 using the obtained trained model.

Here, determination unit 52 determines that information regarding vehicle 3 is to be presented by terminal 7 in a more highly visible style of a presentation as the priority level is higher, a style of a presentation in which an amount of information is greater as the priority level is higher, or a more emphasized style of a presentation as the priority level is higher. In addition, determination unit 52 determines that information regarding vehicles 3 is to be presented in a style of a presentation in which vehicles 3 are arranged in order of decreasing priority level. Presentation controller 55 controls the presentation made by terminal 7 according to a determined style, that is, causes terminal 7 to start presenting the information regarding vehicle 3 when the priority level exceeds a threshold value.

Next, terminal 7 receives the vehicle inside and outside image obtained in step S104 and the priority level information obtained in step S110. Terminal 7 makes a presentation according to the priority levels (step S111). Terminal 7 makes a presentation in various styles according to the priority levels. FIG. 4A to FIG. 4E each illustrate a style of a presentation made by presentation unit 71.

Figure 4A:
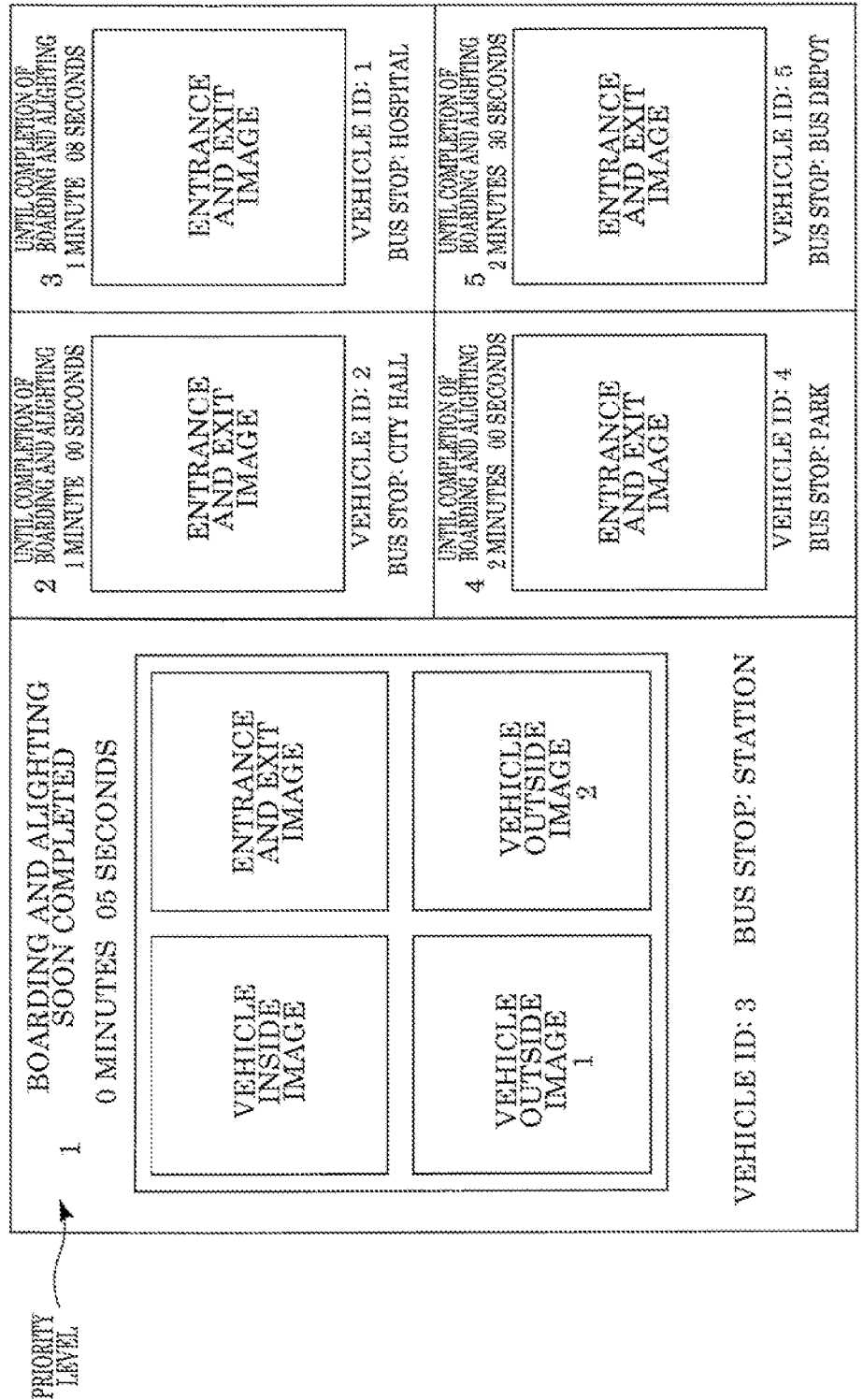
FIG. 4A is a diagram illustrating a presentation made by a terminal according to Embodiment 1.

FIG. 4A is a diagram illustrating a presentation made by terminal 7 according to Embodiment 1. As shown in FIG. 4A, presentation unit 71 presents vehicle 3 having the highest priority level with the large-area image (in a highly visible style). Specifically, presentation unit 71 presents only vehicles 3 having at least a predetermined priority level (threshold value) among vehicles 3, and vehicle 3 having the highest priority level with a large-area image. The information regarding vehicle 3 having the highest priority level indicates the required time for all passengers to complete boarding and alighting from vehicle 3, the images regarding vehicle 3, and the stop. The images regarding vehicle 3 include the vehicle inside image, the entrance and exit image, the vehicle outside images, etc. Moreover, for example, presentation unit 71 presents, for vehicles 3 having the second highest priority level or a lower priority level, information simpler than that of vehicle 3 having the highest priority level. Specifically, presentation unit 71 presents only one kind of images regarding vehicles 3, such as images whose frame rates are reduced and images whose quality is reduced. Furthermore, presentation unit 71 does not present information regarding vehicle 3 having a priority level lower than the predetermined priority level, that is, vehicle 3 having the sixth highest priority level or a lower priority level in the present embodiment.

Figure 4B:
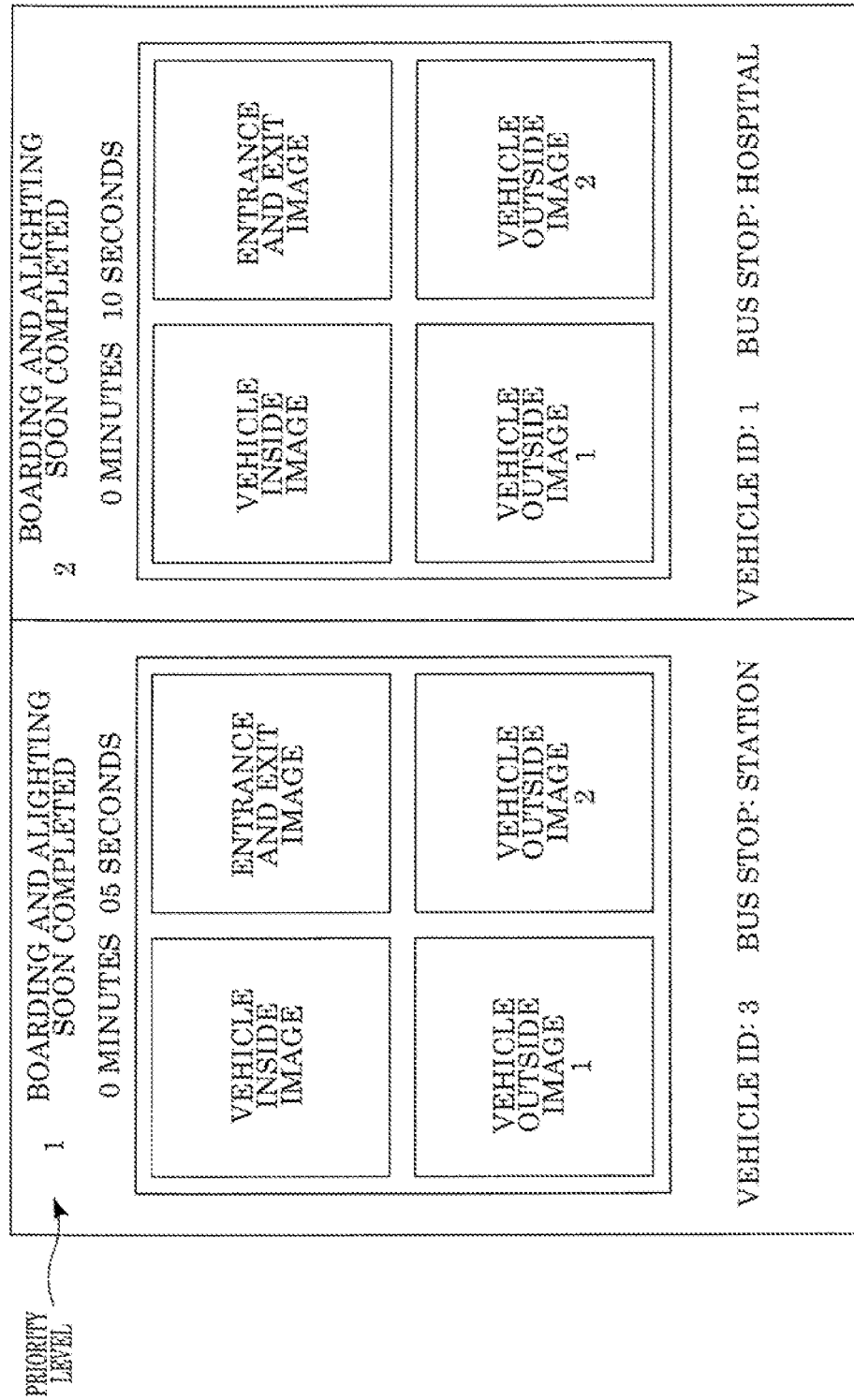
FIG. 4B is a diagram illustrating a presentation made by the terminal according to Embodiment 1.

FIG. 4B is a diagram illustrating a presentation made by terminal 7 according to Embodiment 1. As shown in FIG. 4B, presentation unit 71 presents only the information regarding vehicles 3 having at least a predetermined priority level among vehicles 3. In FIG. 4B, presentation unit 71 presents only the information regarding vehicles 3 having a similar boarding and alighting completion time on a priority basis. In the present embodiment, presentation unit 71 presents information regarding two vehicles 3 but not information regarding other vehicles 3 having the third highest priority level or a lower priority level.

Figure 4C:
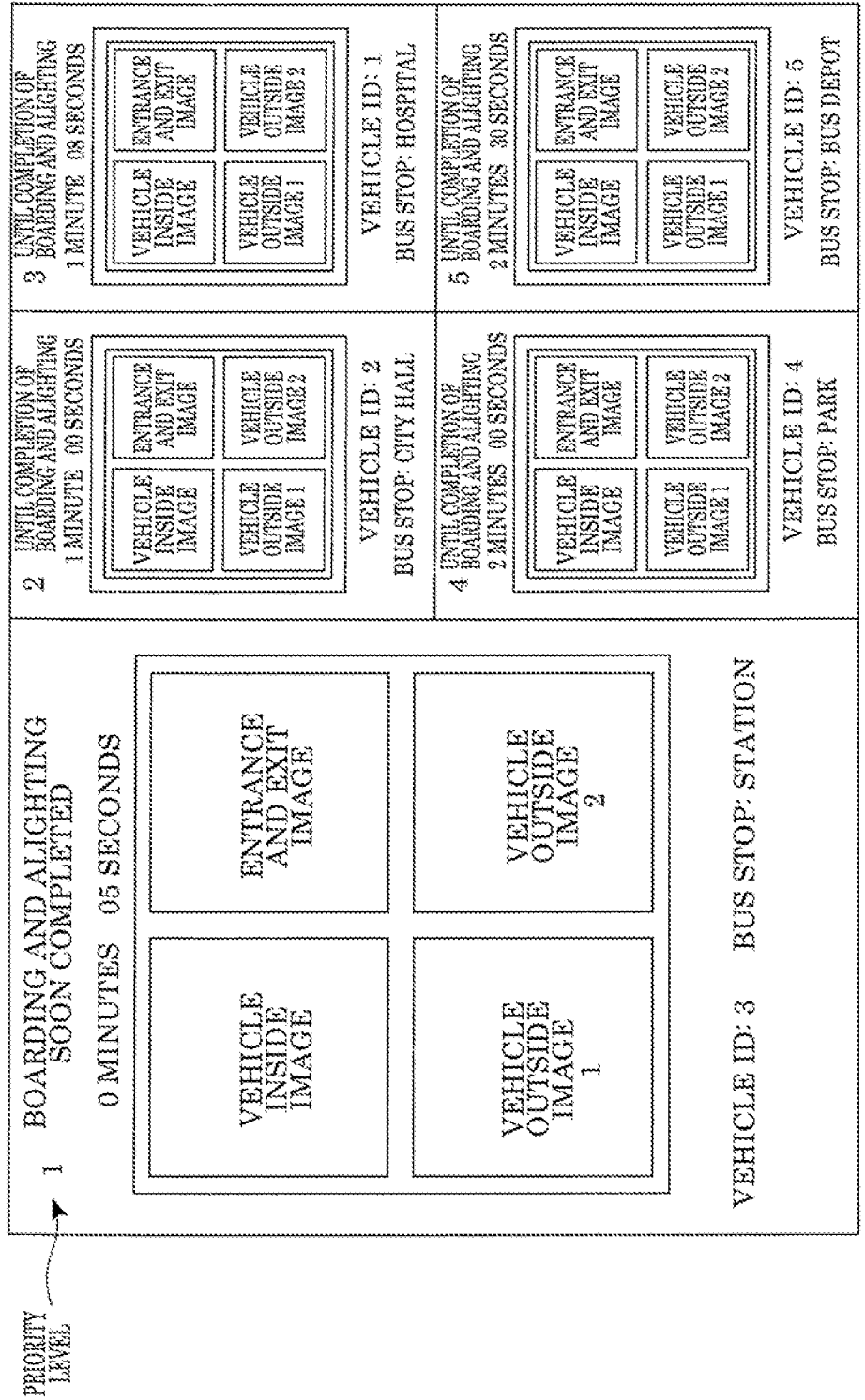
FIG. 4C is a diagram illustrating a presentation made by the terminal according to Embodiment 1.

FIG. 4O is a diagram illustrating a presentation made by terminal 7 according to Embodiment 1. As shown in FIG. 4C, presentation unit 71 presents the information regarding vehicle 3 having the highest priority level with the large-area image, and only vehicles 3 having at least a predetermined priority level among vehicles 3. In FIG. 4C, presentation unit 71 presents the images regarding vehicles 3.

FIG. 4D is a diagram illustrating a presentation made by terminal 7 according to Embodiment 1. As shown in FIG. 4D, presentation unit 71 presents all the images regarding vehicles 3 (in a style of a presentation in which an amount of information is increased) at a size that is large enough to allow an operator to view the information regarding vehicles 3. In FIG. 4D, presentation unit 71 presents the information regarding vehicles 3 arranged in order of decreasing priority level.

FIG. 4E is a diagram illustrating a presentation made by terminal 7 according to Embodiment 1. As shown in FIG. 4E, presentation unit 71 presents the information regarding vehicle 3 leaving the highest priority level that is emphasized by being colored.

It should be noted that the presentations in FIG. 4A to FIG. 4E are mere examples, and the present embodiment is not limited to these. For example, a presentation includes displaying images each showing at least one of the entrance and the exit of a different one of vehicles 3. In addition, a presentation includes images each showing the outside of a different one of vehicles 3.

Here, we will return to the description of the sequence diagram shown in FIG. 3.

When all the passengers complete boarding and alighting from vehicle 3, terminal 7 receives a departure instruction from the operator (step S112). For example, the operator checks on the completion of boarding and alighting via terminal 7. Then, when the operator determines the completion of boarding and alighting, the operator inputs a departure instruction into terminal 7. Terminal 7 receives the departure instruction inputted. It should be noted that, in the checking on the completion of boarding and alighting, terminal 7 may determine whether any passenger is close to the entrance and the exit by image recognition.

When terminal 7 receives the departure instruction from the operator, terminal 7 transmits to vehicle 3 a control command for causing vehicle 3 to depart (step S113).

When vehicle 3 receives the control command transmitted in step S113, vehicle 3 departs (step S114).

Moreover, when terminal 7 receives the departure instruction in step S112, timer 73 measures a boarding and alighting completion time in response to the reception of the departure instruction, and transmits information indicating the boarding and alighting completion time to information processing apparatus 5 (step S115).

Next, determination unit 52 stores into storage controller 53 the information indicating the boarding and alighting start time received in step S101, and updates a database in storage controller 53 (step S118).

Moreover, determination unit 52 calculates a required time from the information indicating the boarding and alighting start time received in step S116 and the information indicating the boarding and alighting completion time stored in step S115, stores the required time into storage controller 53, and updates the database in storage controller 53 (step S118). It should be noted that determination unit 52 may update a trained model using boarding and alighting data such as times, locations, boarding and alighting passenger attributes, boarding and alighting passenger counts, and required times, instead of updating the above database in storage controller 53.

Furthermore, determination unit 52 stores into storage controller 53 the boarding and alighting passenger information obtained in step S106 (step S117), and updates the database in storage controller 53 (step S118).

In this manner, the processing by information processing system 1 is ended. It should be noted that, in information processing system 1, the updating of the database and trained model in storage controller 53 in steps S115 to S118 is not an essential process, and such a process need not be performed.

Figure 5:
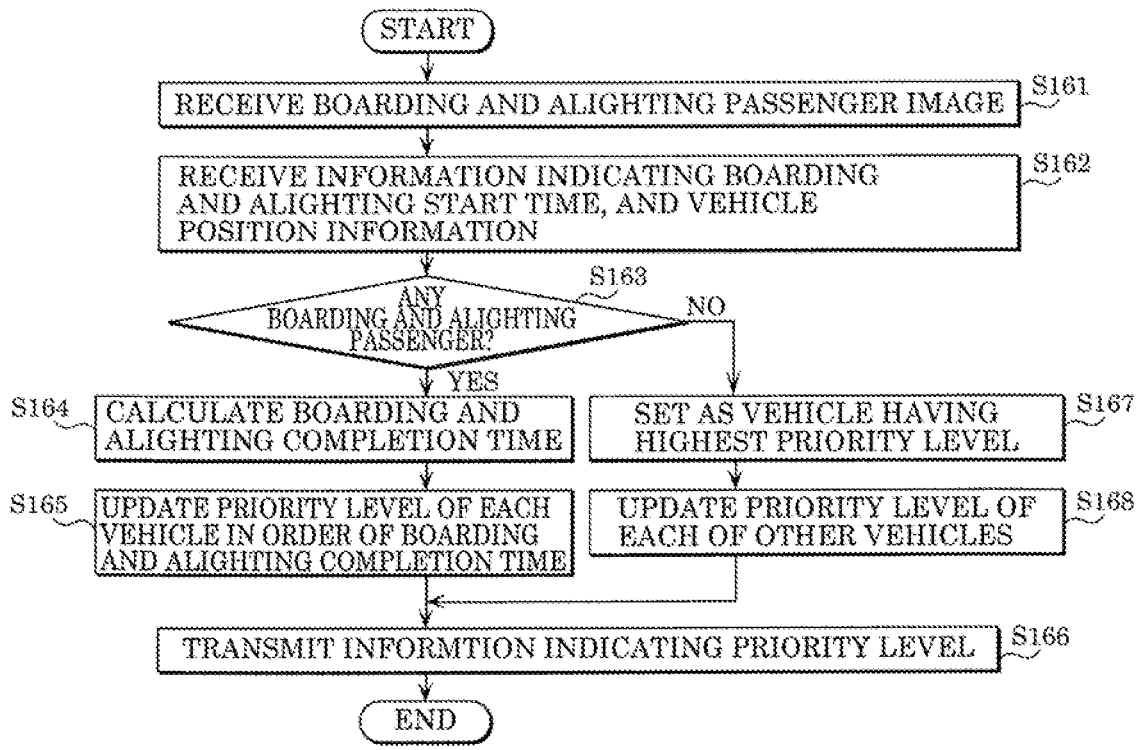
FIG. 5 is a flow chart illustrating determination of a priority level by the operation of an information processing apparatus according to Embodiment 1.

Next, the following describes the operation of information processing apparatus 5 with reference to FIG. 5. Here, processing is performed after vehicle 3 stops at a predetermined position. FIG. 5 is a flow chart illustrating determination of a priority level by the operation of information processing apparatus 5 according to Embodiment 1.

First, as shown in FIG. 5, detection processor 51 of information processing apparatus 5 receives boarding and alighting passenger images from each vehicle 3 (step S161). Detection processor 51 generates boarding and alighting passenger information by detecting a boarding and alighting passenger count, boarding and alighting passenger attributes, etc., based on the boarding and alighting passenger images. Detection processor 51 outputs the boarding and alighting passenger information to determination unit 52.

Determination unit 52 of information processing apparatus 5 receives from vehicle 3 information indicating a boarding and alighting start time, and vehicle position information (step S162).

Determination unit 52 determines whether any boarding and alighting passenger is in vehicle 3 based on the boarding and alight passenger information (step S163). Specifically, determination unit 52 determines whether the boarding and alighting passenger count included in the boarding and alighting passenger information is at least 1.

When the boarding and alighting passenger information indicates one or more boarding and alighting passengers (YES in step S163), determination unit 52 calculates a boarding and alighting completion time. Specifically, determination unit 52 calculates a required time from when all passengers start boarding and alighting to when they complete boarding and alighting, based on the boarding and alighting passenger information, previous boarding and alighting data, etc.

Determination unit 52 adds the calculated required time to the boarding and alighting start time obtained in step S162 to calculate the boarding and alighting completion time for each vehicle 3 (step S164).

Next, determination unit 52 sets higher priority levels to vehicles 3 in order of closeness of the boarding and alighting completion times to the current time. Determination unit 52 sets a priority level to each of vehicles 3 every time vehicle 3 stops at a stop, and updates the priority levels of vehicles 3 in order of boarding and alighting completion time (step S165). The current time is an example of a time.

In contrast, when the boarding and alighting passenger information indicates no boarding and alighting passenger (NO in step S163), determination unit 52 sets the highest priority level to vehicle 3 determined to include no boarding and alighting passenger (step S167). It should be noted that when there are vehicles 3 including no boarding and alighting passenger, determination unit 52 sets all such vehicles 3 as vehicles 3 having the highest priority level. Determination unit 52 calculates a boarding and alighting completion time for each of other vehicles 3 in the same manner as step S164, sets priority levels to other vehicles 3, and updates the priority levels of other vehicles 3 (step S168).

Next, determination unit 52 transmits information indicating the priority levels of vehicles 3 to terminal 7 via communication unit 54 (step S166). In this manner, the processing by information processing apparatus 5 is ended. The same processing is performed at a predetermined position that is the next stop.

Figure 6:
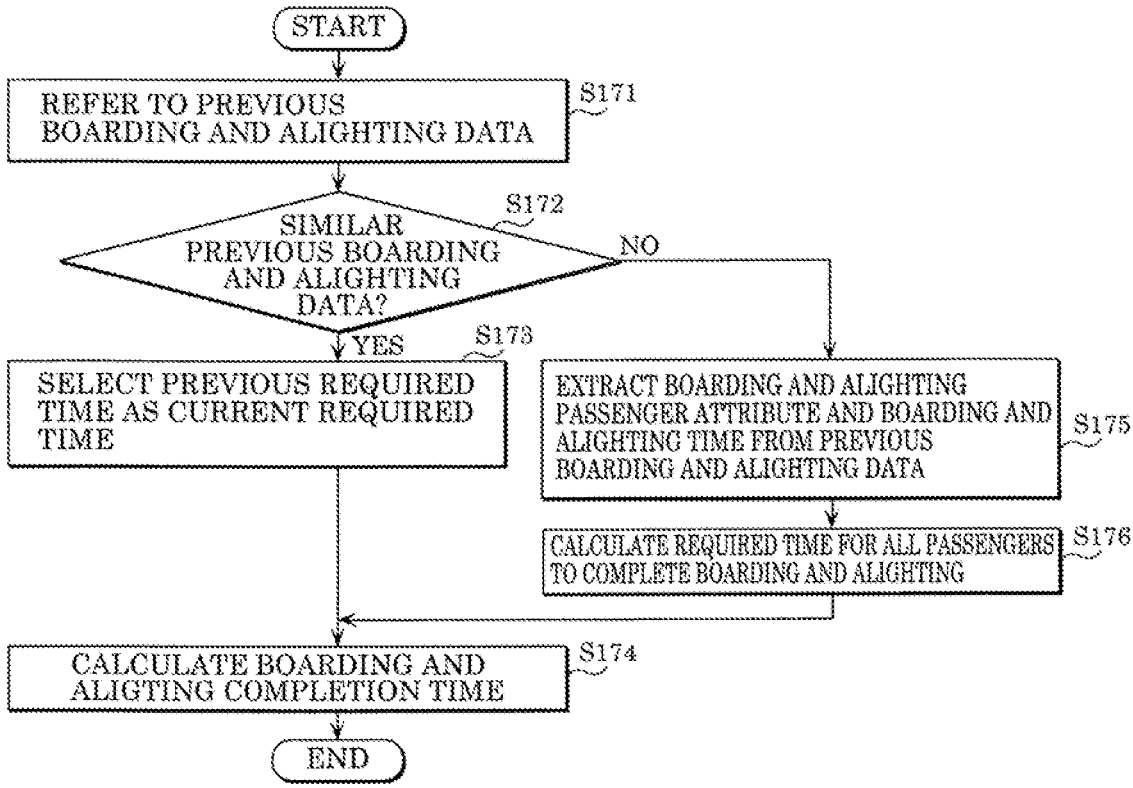
FIG. 6 is a flow chart illustrating calculation of a boarding and alighting completion time using a database by the operation of the information processing apparatus according to Embodiment 1.

In what follows, step S164 of calculating a boarding and alighting completion time in FIG. 5 will be specifically described with reference to FIG. 6. FIG. 6 is a flow chart illustrating calculation of a boarding and alighting completion time using a database by the operation of information processing apparatus 5 according to Embodiment 1. It should be noted that a boarding and alighting completion time may be calculated using a trained model instead of a database.

First, as shown in FIG. 6, determination unit 52 refers to previous boarding and alighting data stored in storage controller 53 (step S171). Specifically, determination unit 52 requests from storage controller 53 previous boarding and alighting data similar to boarding and alighting passenger information, a boarding and alighting start time, and vehicle position information, and obtains the requested previous boarding and alighting data from storage controller 53.

Determination unit 52 determines whether the previous boarding and alighting data similar to the boarding and alighting passenger information, the boarding and alighting start time, and the vehicle position information is in storage controller 53 (step S172). For example, similar previous boarding and alighting data is previous boarding and alighting data similar to at least one of boarding and alighting passenger information, a boarding and alighting start time, and vehicle position information. Take a boarding and alighting start time for example, similar previous boarding and alighting data is temporally close to a boarding and alighting start time, such as within one hour etc. from the boarding and alighting start time.

When the previous boarding and alighting data similar to the boarding and alighting passenger information is determined to be in storage controller 53 (YES in step S172), determination unit 52 selects a required time (previous required time) for all passengers to complete boarding and alighting as the current required time for all passengers to complete boarding and alighting (step S173).

Determination unit 52 calculates a boarding and alighting completion time by adding the required time selected in step S173 to the boarding start time (step S174). Subsequently, the processing is finished.

In contrast, when the previous boarding and alighting data similar to the boarding and alighting passenger information is determined not to be in storage controller 53 (NO in step S172), determination unit 52 extracts, from previous boarding and alighting data stored in storage controller 53, boarding and alighting passenger attributes and boarding and alighting times each corresponding to a different one of the boarding and alighting passenger attributes (step S175).

Determination unit 52 calculates a required tune for all passengers to complete boarding and alighting, based on step S175 (step S176). Determination unit 52 proceeds to step S174 and calculates a boarding and alighting completion time. Subsequently, the processing is finished.

As described above, in the information processing method, information processing apparatus 5, and information processing system 1, when an operator monitors stopped vehicles 3, it is possible to calculate, for each vehicle 3, a required time for all passengers to complete boarding and alighting, based on a boarding passenger count, an alighting passenger count, boarding passenger attributes, and alighting passenger attributes. Information processing apparatus 5 sets a higher priority level for vehicle 3 that requires a shorter boarding and alighting completion time, based on a boarding and alighting start time and a required time. Terminal 7 presents, for example, vehicle 3 having a high priority level with a large-area image, only vehicle 3 having a priority level higher than or equal to a threshold value, information regarding vehicles 3 arranged in the order according to their priority levels, information regarding vehicles 3 in detail, and vehicle 3 having the highest priority level whose image is emphasized by being colored. For this reason, the operator can monitor only vehicles 3 presented by terminal 7, that is, easily find out the vehicles to be monitored. Accordingly, since the number of vehicles 3 to be simultaneously monitored by the operator is reduced, it is possible to diminish the operator's risk for overlooking vehicles 3 to be monitored. As a result, it is possible to reduce the burden of the operator who monitors vehicles 3 while assuring safety for vehicles 3 by the monitoring.

EMBODIMENT 2

(Configuration)

In the present embodiment, a case is described in which vehicle 130 is assumed to be self-driving.

Unless otherwise specifically stated, the configurations of an information processing method, information processing apparatus 150, and information processing system 101 according to the present embodiment are the same as Embodiment 1. The same reference signs are given to the same components, and the detailed description of the components is omitted.

Figure 7:
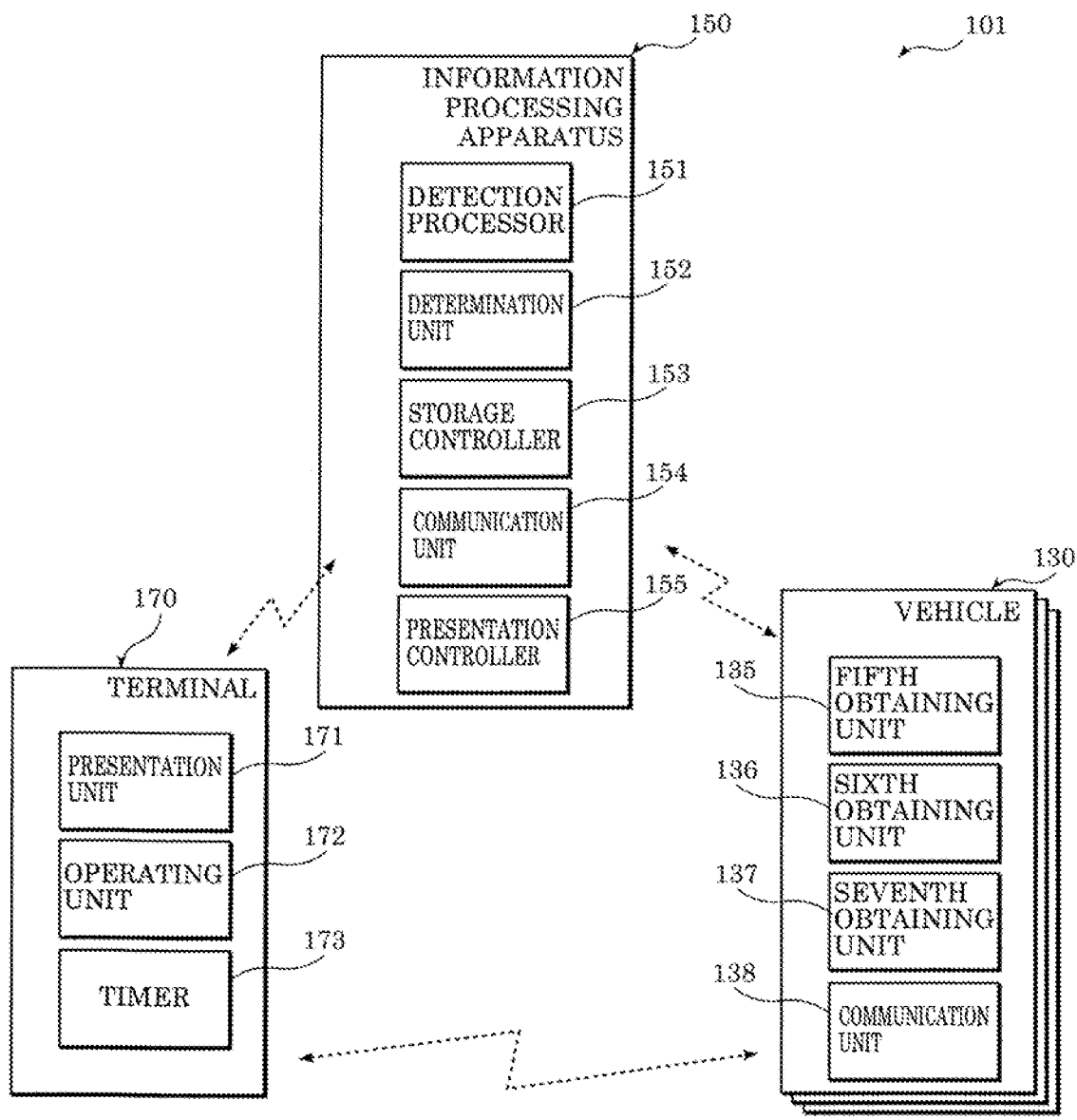
FIG. 7 is a block diagram of an information processing system according to Embodiment 2.

FIG. 7 is a block diagram of information processing system 101 according to Embodiment 2.

As shown in FIG. 7, information processing system 101 includes vehicle 130, information processing apparatus 150, and terminal 170.

Vehicle 130 includes fifth obtaining unit (fifth obtainer) 135, sixth obtaining unit (sixth obtainer) 136, seventh obtaining unit (seventh obtainer) 137, and communication unit 138.

Fifth obtaining unit 135 is a device that obtains vehicle state information indicating the state of vehicle 130, and is, for example, an electronic control unit (ECU). Vehicle state information includes information indicating the state of vehicle 130, such as moving, temporary stop, emergency stop, and speed. Fifth obtaining unit 135 transmits vehicle state information to information processing apparatus 150 and terminal 170.

Sixth obtaining unit 136 obtains vehicle position information (e.g. GPS information) indicating the current position of vehicle 130. Sixth obtaining unit 136 transmits the obtained vehicle position information to information processing apparatus 150 and terminal 170.

Seventh obtaining unit 137 performs object detection processes. The object detection processes are each performed to detect any object outside a moving vehicle, and the position of the object. Seventh obtaining unit 137 obtains sensor information indicating a passenger state inside vehicle 130, the position of an object outside vehicle 130, etc. Seventh obtaining unit 137 is an image sensor such as a camera that captures images of the outside and inside of vehicle 130, a distance sensor such as a laser imaging detection and ranging (LIDAR), etc. Seventh obtaining unit 137 transmits sensor information to information processing apparatus 150 and terminal 170. Examples of the object outside vehicle 130 include a person walking ahead of vehicle 130 and a bicycle behind vehicle 130. Seventh obtaining unit 137 is an example of a sensor.

Communication unit 138 is a communication interface that transmits vehicle state information, vehicle position information, and sensor information to information processing apparatus 150. In addition, communication unit 138 receives control commands for remote control when vehicle 130 is remotely controlled by a remote control operator.

Detection processor 151 of information processing apparatus 150 obtains sensor information from seventh obtaining unit 137 of vehicle 130, and generates vehicle inside and outside information indicating a passenger state inside vehicle 130, an object outside vehicle 130, etc., based on the sensor information. Detection processor 151 outputs the vehicle inside and outside information to determination unit 152.

When determination unit 152 of information processing apparatus 150 obtains the vehicle inside and outside information from detection processor 151, determination unit 152 obtains previous vehicle data stored in a database in storage controller 153. Specifically, determination unit 152 requests from storage controller 153 previous vehicle data similar to the vehicle inside and outside information, and obtains the requested previous vehicle data from storage controller 153. It should be noted that determination unit 152 may request from storage controller 153 a trained model created based on previous vehicle data stored in a database in storage controller 153, instead of the previous vehicle data, and may obtain the trained model from storage controller 153.

Determination unit 152 calculates at least one of a difficulty level of self-driving by each vehicle 130 and a danger level outside vehicle 130, based on sensor information, previous vehicle data, etc. A difficulty level of self-driving is a parameter indicating the ease of moving by vehicle 130. For example, when vehicle 130 is moving on a narrow road or vehicle 130 is moving in rain, fog, etc., a difficulty level of self-driving is high. A danger level outside vehicle 130 is a parameter indicating a possibility of an accident in an area in which vehicle 130 is moving. For example, an area with danger of rushing out, an area under construction, etc. have a high danger level. Hereinafter, the present embodiment will be described using mainly a danger level. It should be noted that determination unit 152 may calculate at least one of a difficulty level of self-driving by each vehicle 130 and a danger level outside vehicle 130 using an obtained trained model instead of sensor information, previous vehicle data, etc.

Storage controller 153 of information processing apparatus 150 is a storage device that stores previous vehicle data. Vehicle data is information, such as a label, a location corresponding to the label, a recommended operation corresponding to the label, and a danger level corresponding to the label. A label is a descriptive text about a location, such as an area with danger of rushing out and under construction. In response to a request from determination unit 152, storage controller 153 searches for previous vehicle data similar to vehicle inside and outside information, and transmits the similar previous vehicle data to determination unit 152. It should be noted that a danger level is optionally changed, and varies depending on, for example, the number of people outside vehicle 130. It should be noted that storage controller 153 may store a trained model trained based on previous vehicle data, instead of the previous vehicle data.

FIGS. 8A, 8B, and FIG. 8C each are a table illustrating previous vehicle data according to Embodiment 2. As shown in FIG. 8A, previous vehicle data includes "LOCATION" in which a dangerous situation has occurred, "LABEL" that is a descriptive text about a dangerous situation, "RECOMMENDED OPERATION" corresponding to a label, and "DANGER LEVEL" corresponding to a label. As shown in FIG. 8B, the previous vehicle data further includes "STATE" into which vehicle 130 has gone, such as autonomous emergency braking (AEB) activation and temporary stop, "LABEL" that is a descriptive text corresponding to a state, "RECOMMENDED OPERATION" corresponding to a state, and "DANGER LEVEL" corresponding to a state. As shown in FIG. 8C, the previous vehicle data further includes "SITUATION" of the outside of vehicle 130 while vehicle 130 is moving, such as a pedestrian on a road and a bicycle behind vehicle 130, "LABEL" that is a descriptive text about a situation, "RECOMMENDED OPERATION" corresponding to a situation, and "DANGER LEVEL" corresponding to a situation.

As shown in FIG. 7, presentation unit 171 of terminal 170 receives via communication unit 173 information regarding vehicles 130, such as the priority levels, states, inside images, outside images, vehicle IDs, and current positions of vehicles 130, and presents the received information for each vehicle 130.

Presentation unit 171 of terminal 170 presents, for example, vehicle 130 having the highest priority level with a large-area image, only vehicle 130 having a priority level higher than or equal to a threshold value among vehicles 130, information regarding vehicles 130 in detail, information regarding vehicles 131 arranged in the order according to their priority levels with same-size images, and vehicle 130 having the highest priority level whose image is emphasized by being colored.

(Operation)

Next, the following describes the operation of the information processing method, information processing apparatus 150, and information processing system 101 according to the present embodiment. Specifically, the following describes the operation of information processing system 101 performed while vehicle 130 is moving.

Figure 9:
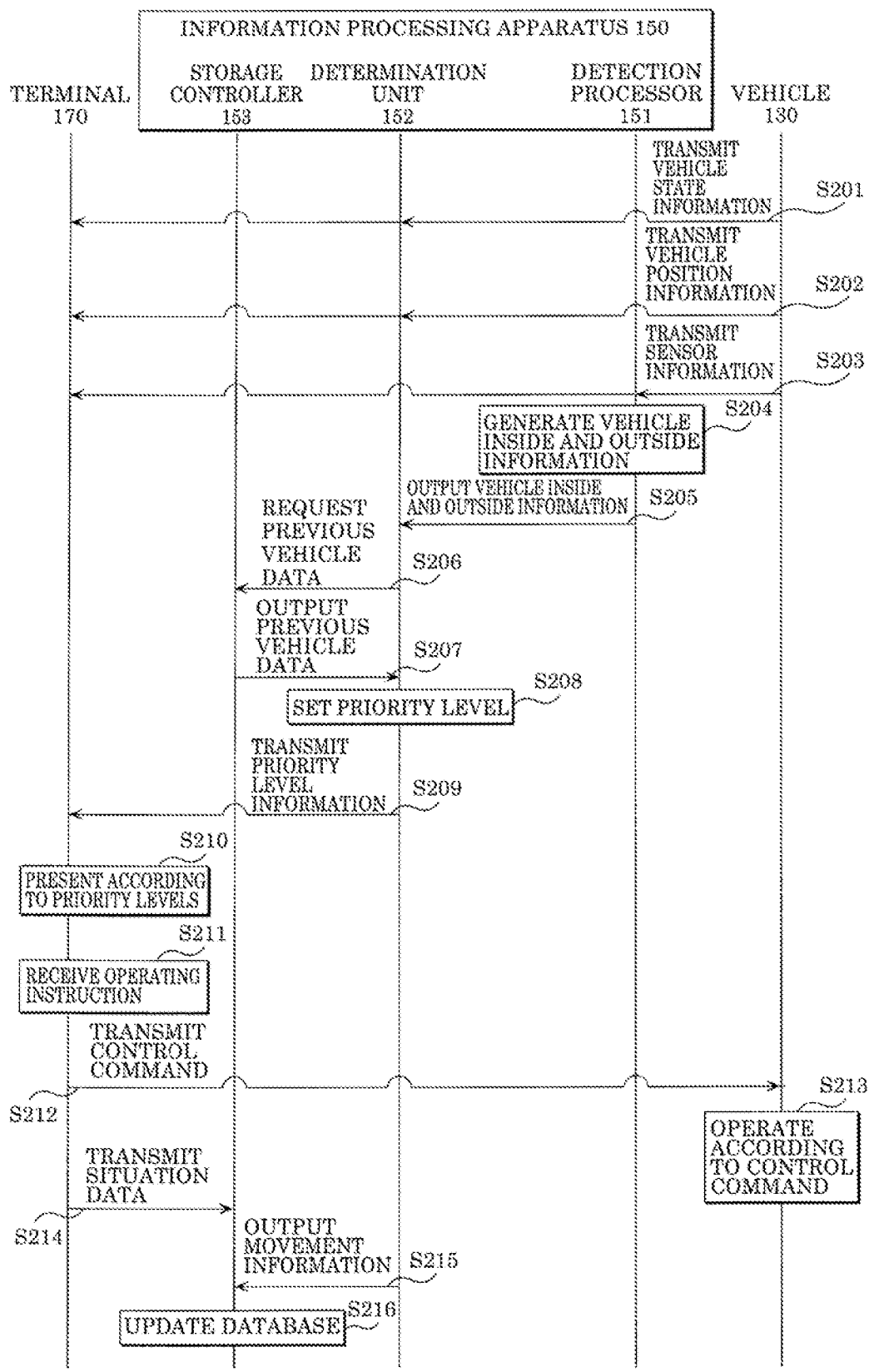
FIG. 9 is a sequence diagram illustrating the operation of the information processing system according to Embodiment 2.

FIG. 9 is a sequence diagram illustrating the operation of information processing system 101 according to Embodiment 2.

As shown in FIG. 9, vehicle 130 obtains and transmits vehicle state information to information processing apparatus 150 and terminal 170 (step S201). Determination unit 152 of information processing apparatus 150 receives the vehicle state information via communication unit 154.

In addition, vehicle 130 obtains vehicle position information indicating the current position of vehicle 130, and transmits the vehicle position information to information processing apparatus 150 and terminal 170 (step S202). Determination unit 152 of information processing apparatus 150 receives the vehicle position information via communication unit 154.

Vehicle 130 obtains sensor information indicating a passenger state inside vehicle 130, vehicle's surroundings, that is, an object outside vehicle 130, the position of the object, etc., and transmits the obtained sensor information to information processing apparatus 150 and terminal 170 (step S203). Determination unit 152 of information processing apparatus 150 receives the sensor information via communication unit 154.

Detection processor 151 generates vehicle inside and outside information indicating the passenger state inside vehicle 130, the position of the object outside vehicle 130, etc., based on the sensor information received in step S203 (step S204). Detection processor 151 outputs the vehicle inside and outside information to determination unit 152 (step S205).

Determination unit 152 requests from storage controller 153 previous vehicle data similar to the obtained vehicle inside and outside information (step S206).

In response to the request from determination unit 152, storage controller 153 searches for the previous vehicle data similar to the vehicle inside and outside information, and transmits the similar previous vehicle data to determination unit 152 (step S207). Previous vehicle data is illustrated by FIG. 8A to FIG. 8C, and is information including, for example, a location, the location corresponding to a label, a recommended operation corresponding to the label, a danger level corresponding to the location, the state of vehicle 130, and a situation corresponding to the location.

Determination unit 152 obtains the previous vehicle data from storage controller 153, and sets a priority level to each vehicle 130, for monitoring vehicles 130 on a priority basis (step S208). Determination unit 152 sets the priority level based on a danger level. The determination of the priority level will be described later. Determination unit 152 transmits information indicating the set priority level of vehicle 130 to terminal 170 (step S209).

Next, terminal 170 receives the vehicle state information obtained in step S201, the vehicle inside and outside information, and the information indicating the priority level of vehicle 130 set in step S209. Terminal 170 makes a presentation according to the priority levels (step S210).

Terminal 170 makes a presentation in various styles according to the priority levels. FIG. 10A to FIG. 10F each illustrate a style of a presentation made by presentation unit 171.

FIG. 10A is a diagram illustrating a presentation made by terminal 170 according to Embodiment 2. As shown in FIG. 10A, presentation unit 171 presents vehicle 130 having the highest priority level with a large-area image. Specifically, presentation unit 171 presents only vehicles 130 having at least a predetermined priority level among vehicles 130 and vehicle 130 having the highest priority level with a large-area image in detail. The information regarding vehicle 130 having the highest priority level indicates the priority level, state, inside image, outside images, vehicle ID, current position, etc. of vehicle 130. Moreover, for example, presentation unit 171 presents, for vehicle 130 having the second highest priority level or lower priority level, information simpler than that of vehicle 130 having the highest priority level. Specifically, presentation unit 171 presents only one kind of an image regarding vehicle 130. Furthermore, presentation unit 171 does not present information regarding vehicle 130 having a priority level lower than the predetermined priority level, that is, vehicle 130 having the sixth highest priority level or a lower priority level in the present embodiment.

FIG. 10B is a diagram illustrating a presentation made by terminal 170 according to Embodiment 2. As shown in FIG. 10B, presentation unit 171 presents only the information regarding vehicles 130 having at least a predetermined priority level among vehicles 130. In the present embodiment, presentation unit 171 presents information regarding two vehicles 130 but not information regarding other vehicles 130 having the third highest priority level or a lower priority level.

FIG. 10C is a diagram illustrating a presentation made by terminal 170 according to Embodiment 2. As shown in FIG. 10C, presentation unit 171 presents the information regarding vehicles 130 having the highest priority level with the large-area images, and only vehicles 130 having at least a predetermined priority level among vehicles 130. In FIG. 10C, presentation unit 171 presents every detail of the information regarding vehicles 130.

FIG. 10D is a diagram illustrating a presentation made by terminal 170 according to Embodiment 2. As shown in FIG. 10D, presentation unit 171 presents the information regarding vehicles 130 at a size that is large enough for an operator to view the information regarding vehicles 130. In FIG. 10D, presentation unit 171 presents the information regarding vehicles 130 arranged in order of decreasing priority level.

FIG. 10E is a diagram illustrating a presentation made by terminal 170 according to Embodiment 2. As shown in FIG. 10E, presentation unit 171 presents the information regarding vehicle 3 having the highest priority level that is emphasized by being colored.

Figure 10F:
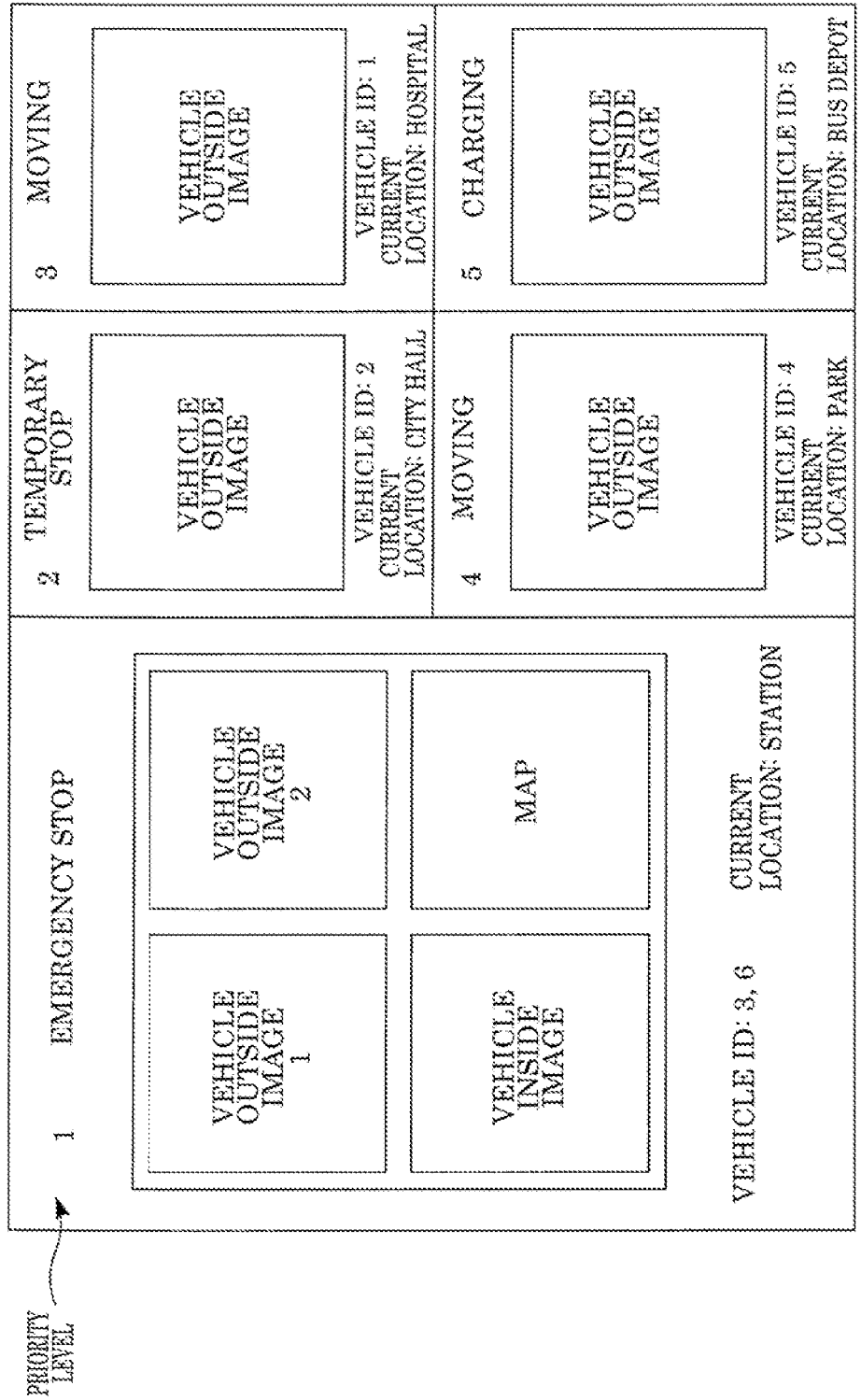
FIG. 10F is a diagram illustrating a presentation made by the terminal according to Embodiment 2.

FIG. 10F is a diagram illustrating a presentation made by terminal 170 according to Embodiment 2. As shown in FIG. 10F, when vehicles 130 are continuously moving in column, presentation unit 171 collectively presents vehicles 130 as single vehicle 130.

It should be noted that the presentations in FIG. 10A to FIG. 10F are mere examples, and the present embodiment is not limited to these.

Here, we will return to the description of the sequence diagram shown in FIG. 9.

Terminal 170 receives an operating instruction from the operator (step S211). For example, the operator checks on the operating status of each vehicle 130 based on the presentation made by terminal 170. Then, the operator inputs the operating instruction to terminal 170. When terminal 170 receives the operating instruction from the operator, terminal 170 transmits a control command to vehicle 130 presented by terminal 170 (step S212). Here, the control command is a command for controlling the movement of vehicle 130, such as an emergency stop, a temporary stop, slow down, and steering operation of vehicle 130.

When vehicle 130 receives the control command transmitted in step S212, vehicle 130 performs an operation and display according to the control command (step S213). In this manner, the processing by information processing system 101 is ended.

Terminal 170 generates situation data indicating an evaluation according to the control command transmitted in step S212. For example, when driving at reduced speed is performed due to an act of rushing out at point A, terminal 170 generates situation data indicating a location as "point A" a label as "danger of rushing out," a recommended operation as "slow down," and a danger level as "high." It should be noted that situation data may be generated by the operator making an input operation via operating unit 172. In addition, terminal 170 may automatically generate situation data. Terminal 170 transmits the generated situation data to information processing apparatus 150 (step S214). Storage controller 153 of information processing apparatus 150 receives the situation data via communication unit 154. Storage controller 153 stores the situation data and updates a database in storage controller 153.

Moreover, determination unit 152 generates, for example, movement information indicating a position at which vehicle 130 has stopped, information about an object outside vehicle 130 at the time, etc., based on the vehicle state information, vehicle position information, and sensor information, and outputs the movement information to storage controller 153 (step S215).

Storage controller 153 obtains the movement information and updates the database in storage controller 153 (step S216). In this manner, the processing by information processing system 101 is ended.

It should be noted that, in information processing system 101, the update of the database in storage controller 153 from step S214 to step S216 is not an essential process, and such a process need not be performed.

Figure 11:
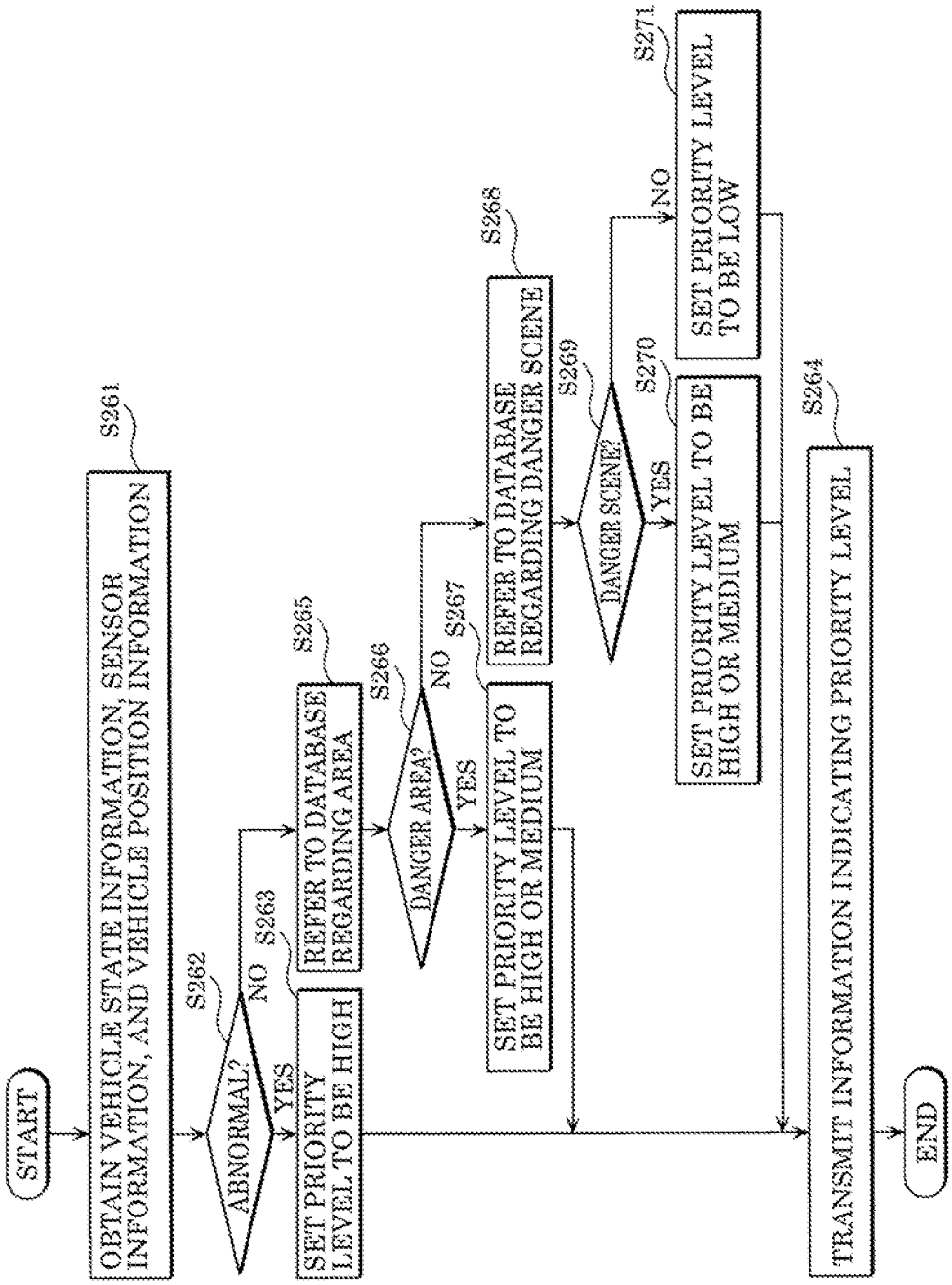
FIG. 11 is a flow chart illustrating determination of a priority level by the operation of an information processing apparatus according to Embodiment 2.

The following describes how information processing apparatus 150 sets a priority level in detail. FIG. 11 is a flow chart illustrating determination of a priority level by the operation of information processing apparatus 150 according to Embodiment 2. It should be noted that a priority level may be determined using a trained model instead of a database.

First, as shown in FIG. 11, information processing apparatus 150 obtains vehicle state information, sensor information, and vehicle position information (step S261).

Determination unit 152 of information processing apparatus 150 determines whether vehicle 130 is abnormal based on the vehicle state information (step S262). Specifically, determination unit 152 determines whether the vehicle state information includes information indicating a highly dangerous operation when vehicle 130 is moving, such as AEB activation.

When vehicle 130 is determined to be abnormal (YES in step S262), determination unit 152 sets the priority level of vehicle 130 having transmitted the vehicle state information to be "high" (step S263).

Determination unit 152 transmits information indicating the priority level of vehicle 130, which is set in step S263, to terminal 170 (step S264).

When vehicle 130 is determined not to be abnormal (NO in step S262), determination unit 152 refers to a database regarding areas stored in storage controller 153 (step S265).

Specifically, determination unit 152 searches the database for a location (an area) in which vehicle 130 is currently moving, based on the vehicle position information.

Determination unit 152 determines whether the area in which vehicle 130 is currently moving includes a danger point, based on the vehicle position information (step S266). Examples of the danger point include a point with danger of rushing out and a point under construction.

When the area in which vehicle 130 is currently moving is determined to include the danger point in the database (YES in step S266), determination unit 152 sets the priority level of vehicle 130, to which the information has been transmitted in step S261, to be "high" or "medium" (step S267), and proceeds to step S264.

When the area in which vehicle 130 is currently moving is determined not to include the danger point in the database (NO in step S266), determination unit 152 refers to a database regarding danger scenes stored in storage controller 153, based on the vehicle position information and the sensor information (step S268). Specifically, determination unit 152 searches the database in storage controller for the area in which vehicle 130 is currently moving, based on the vehicle position information and the sensor information. Here, a danger scene is a scene in which vehicle 130 is expected to face a danger in an area in which vehicle 130 has difficulty self-driving. For example, a danger scene is a case in which a bicycle is moving on the same road as vehicle 130, a case in which a bicycle is approaching vehicle 130 from behind, and a case in which there are many blind spots due to on-street parking and there is the danger of rushing out.

Determination unit 152 determines whether the area in which vehicle 130 is currently moving includes the danger scene, based on the vehicle position information and the sensor information (step S269).

When the area is determined to include the danger scene (YES in step S269), determination unit 152 sets the priority level of vehicle 130, to which the information has been transmitted in step S261, to be "high" or "medium" (step S270), and proceeds to step S264.

When the area is determined not to include the danger scene (NO in step S269), determination unit 152 sets the priority level of vehicle 130, to which the information has been transmitted in step S261, to be "low" (step S271), and proceeds to step S264. As described above, information processing apparatus 150 determines the priority level and ends the processing. Although there are three priority levels of "high," "medium," and "low" in the present embodiment, there may be two priority levels or at least four priority levels.

It should be noted that a danger level is thought to differ depending on an area in which vehicle 130 is moving, the weather of the area, etc. Accordingly, for example, when vehicle 130 is moving on a narrow road or rain, fog, etc. has started, determination unit 152 may set the priority level to be "high" in step S267 and step S270, the priority level to be "very high" in step S263, and the priority level to be "medium" in step S267. Determination unit 152 may obtain weather information about the area in which vehicle 130 is moving from an external server via communication unit 154.

As above, in the information processing method, information processing apparatus 150, and information processing system 101, it is possible to calculate the danger level for each vehicle 130 based on the sensor information indicating the internal state and external state of vehicle 130 when the operator monitors moving vehicles 130. Information processing apparatus 150 presents, as vehicle 130 to be monitored on a priority basis, vehicle 130 having a higher outside vehicle danger level, based on the danger level. Terminal 170 presents: vehicle 130 having a high priority with the large-area image; only vehicle 130 having the priority level higher than or equal to the threshold value; detailed information regarding all vehicles 130; information regarding vehicles 130 as much as possible; and vehicle 130 having the highest priority level whose image is emphasized by being colored. For this reason, the operator can monitor only vehicles 130 presented by terminal 170, that is, more accurately find out vehicles 130 to be monitored. As a result, it is possible to further assure safety for the vehicles by monitoring the vehicles.

OTHER VARIATIONS

Although the information processing methods, information processing apparatuses 5 and 150, and information processing systems 1 and 101 according to Embodiments 1 and 2 of the present disclosure have been described above, the information processing methods, information processing apparatuses 5 and 150, and information processing systems 1 and 101 are not limited to aforementioned Embodiments 1 and 2.

For example, in the information processing method, information processing apparatus 5, and information processing system 1 according to aforementioned Embodiment 1, the example is given in which the style of the presentation for monitoring or controlling vehicles 3 is determined according to the boarding and alighting passengers, a style of a presentation may be determined according to the congestion degrees of vehicles 3. For example, detection processor 51 detects the numbers of passengers, the numbers of empty seats, etc. inside vehicles 3 from vehicle inside and outside images obtained by fourth obtaining unit 34, and generates congestion degree information. Determination unit 52 determines priority levels based on the congestion degree information. Presentation controller 55 controls a style of a presentation based on the priority levels.

Moreover, when the same priority level is determined for vehicles 3 and 130 in the information processing methods, information processing apparatuses 5 and 150, and information processing systems 1 and 101 according to aforementioned Embodiments 1 and 2, information processing apparatuses 5 and 150 may notify vehicles 3 and 130 about the same priority level, and an announcement may be made in vehicles 3 and 130 based on the notification.

Moreover, in the information processing methods, information processing apparatuses 5 and 150, and information processing systems 1 and 101 according to aforementioned Embodiments 1 and 2, a portion of an image presented in a style based on priority levels may be emphasized, the portion relating to information used to determine the priority levels, and the image may be presented in a distinguishable manner. Specifically, the information used to determine the priority levels may be a detected object. For example, any boarding and alighting passenger in an image may be highlighted in Embodiment 1. Further, any pedestrian or vehicle in an image may be highlighted in Embodiment 2. Examples of a style of highlighting may include adding a color, a pattern, or a frame to an object, and flashing of an object.

Moreover, each processing component included in the information processing methods, information processing apparatuses 5 and 150, and information processing systems 1 and 101 according to aforementioned Embodiments 1 and 2 is implemented as an LSI (large-scale integrated circuit)

that is typically an integrated circuit. The integrated circuits may be implemented in a single chip individually, or in a single chip that includes some or all of them.

Moreover, the method of circuit integration is not limited to LSI. Integration may be realized with a specialized circuit or a general purpose processor. A field-programmable gate array (FPGA) for which programming can be performed after an LSI is fabricated or a reconfigurable processor capable of reconfiguring connections and settings of circuit cells of an LSI may be used, instead.

It should be noted that each of the structural components in each of aforementioned Embodiments 1 and 2 may be configured in the form of an exclusive hardware produce, or may be implemented by executing a software program suitable for the structural component. Each of the structural components may be implemented by means of a program executing unit, such as a CPU or a processor, reading and executing the software program recorded on a recording medium such as a hard disk or a semiconductor memory.

Moreover, numbers in the above description are examples used for specifically describing the present disclosure, and Embodiments 1 and 2 of the present disclosure are not limited by such numbers.

Moreover, the block diagrams illustrate one example of the division of functional blocks: a plurality of functional blocks may be implemented as a single functional block, a single functional block may be broken up into a plurality of functional blocks, and part of one function may be transferred to another functional block. In addition, functions of a plurality of functional blocks having similar functions may be processed in parallel or by time-division by a single hardware or software product.

Furthermore, since the processing order of the steps in each flow chart is one example given for specifically describing the present disclosure, other processing orders may be adopted. In addition, a part of the steps may be performed simultaneously (in parallel) with another step.

The information processing methods, information processing apparatuses 5 and 150, and information processing systems 1 and 101 according to one or more aspects of the present disclosure have been described above based on Embodiments 1 and 2, Embodiments 1 and 2 of the present disclosure are not limited to the one or more aspects. Although only some exemplary embodiments of the present disclosure have been described in detail above, those skilled in the art, will readily appreciate that many modifications are possible in the exemplary embodiments without materially departing from the novel teachings and advantages of the present disclosure. Accordingly, all such modifications are intended to be included within the scope of the present disclosure.

It should be noted that, as described in Embodiments 1 and 2, machine learning may be used for the processes performed by detection processors 51 and 151 and determination units 52 and 152. Examples of machine learning include: supervised learning that learns a relationship between input and output using teaching data in which a label (output information) is given to input information; unsupervised learning that builds a data structure from only unlabeled inputs; semi-supervised learning that makes use of both labeled and unlabeled data; and reinforcement learning that learns continuous actions capable of receiving the greatest reward, by receiving feedback (reward) for actions selected based on state observation results. Further, examples of a specific technique of machine learning include neural networks (including deep learning using multi-layer neural networks), genetic programming, decision trees, Bayesian networks, and support vector machines (SVMs). The present disclosure may use any one of the above specific examples.

INDUSTRIAL APPLICABILITY

The present disclosure is applicable to devices that remotely operate self-driving vehicles, terminals that present the states of self-driving vehicles, or systems including these devices. In particular, the present disclosure is applied to self-driving buses, self-driving taxis, and self-driving trains.

What is claimed is:

1. An information processing method, comprising:
obtaining, by an information processing apparatus, from vehicles, sensor data obtained from sensors of the vehicles;
performing, by the information processing apparatus, object detection processes for each vehicle using a different one of the sensor data;
determining, by the information processing apparatus, a style of a presentation for an operator to monitor or control the vehicles, using results of the object detection processes; and
controlling the presentation made by a presentation device according to the style determined,
wherein in each of the object detection processes for each vehicle of the vehicles, an object outside a moving vehicle and a position of the object are detected,
wherein the determining of the style of the presentation includes:
calculating, by the information processing apparatus, for each vehicle of the vehicles, a danger level outside the vehicle, using the object and the position of the object detected;
determining, by the information processing apparatus, priority levels of the vehicles according to the danger level outside the vehicle that has been calculated for each vehicle so that the presentation is preferentially made to the operator; and
determining the style of the presentation for the operator according to the priority levels determined, the style being a style in which a vehicle among the vehicles having a higher calculated danger level is presented as the vehicle to be preferentially monitored.

2. An information processing apparatus, comprising:
an obtaining unit that obtains, from vehicles, sensor data obtained from sensors of the vehicles;
a detection processor that performs object detection processes for each vehicle using a different one of the sensor data;
a determination unit that determines a style of a presentation for an operator to monitor or control the vehicles, using results of the object detection processes; and
a presentation controller that controls the presentation made by a presentation device according to the style determined,
wherein in each of the object detection processes for each vehicle of the vehicles, an object outside a moving vehicle and a position of the object are detected, and
wherein the determination unit calculates, for each vehicle of the vehicles, a danger level outside the vehicle, using the object and the position of the object detected,
wherein the determination unit determines priority levels of the vehicles according to the danger level outside the vehicle that has been calculated for each vehicle so that the presentation is preferentially made to the operator, and wherein the determination unit determines the style of the presentation for the operator according to the priority levels determined, the style being a style in which a vehicle among the vehicles having a higher calculated danger level is presented as the vehicle to be preferentially monitored.

* * * * *